US012579625B2

(12) United States Patent
Zhao et al.

(10) Patent No.: US 12,579,625 B2
(45) Date of Patent: Mar. 17, 2026

(54) SKIN CARE AUXILIARY METHOD, DEVICE, AND STORAGE MEDIUM

(71) Applicant: Huawei Technologies Co., Ltd., Shenzhen (CN)

(72) Inventors: Lin Zhao, Beijing (CN); Yuewan Lu, Shenzhen (CN); Zhaoying Yao, Shenzhen (CN); Chen Dong, Shenzhen (CN); Hongwei Hu, Beijing (CN); Wenmei Gao, Shenzhen (CN)

(73) Assignee: HAUWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 18/042,702

(22) PCT Filed: Jul. 29, 2021

(86) PCT No.: PCT/CN2021/109140
§ 371 (c)(1),
(2) Date: Feb. 23, 2023

(87) PCT Pub. No.: WO2022/042195
PCT Pub. Date: Mar. 3, 2022

(65) Prior Publication Data
US 2023/0334641 A1      Oct. 19, 2023

(30) Foreign Application Priority Data
Aug. 24, 2020     (CN) .......................... 202010857343.5

(51) Int. Cl.
*G06T 7/00*           (2017.01)
*G06T 7/246*          (2017.01)
(Continued)

(52) U.S. Cl.
CPC ........... *G06T 7/0002* (2013.01); *G06T 7/248* (2017.01); *G06T 11/00* (2013.01); *G06V 40/10* (2022.01);
(Continued)

(58) Field of Classification Search
None
See application file for complete search history.

(56) References Cited

U.S. PATENT DOCUMENTS

2012/0321759 A1* 12/2012 Marinkovich ......... A61B 5/442
356/402
2020/0250410 A1      8/2020 Loorak et al.

FOREIGN PATENT DOCUMENTS

CN         103870821 A      6/2014
CN         207870685 U      9/2018
(Continued)

*Primary Examiner* — Samira Monshi
(74) *Attorney, Agent, or Firm* — Conley Rose, P.C.

(57)          ABSTRACT

A method includes, in response to a first operation performed on a first electronic device, obtaining, by the first electronic device, an image using a camera of the first electronic device, where the image includes a hand region and a face region, and the first operation indicates a start of a skin care process; extracting a target image feature from the image, where the target image feature is a feature related to the hand region and the face region; and outputting integrity of the skin care process based on target image features corresponding to a plurality of frames of images, where the frames of images are images generated in a time sequence in the skin care process.

20 Claims, 19 Drawing Sheets

(51) Int. Cl.
 *G06T 11/00* (2006.01)
 *G06V 40/10* (2022.01)
 *G06V 40/20* (2022.01)

(52) U.S. Cl.
 CPC .... *G06V 40/20* (2022.01); *G06T 2207/30088* (2013.01); *G06T 2207/30201* (2013.01)

(56) References Cited

FOREIGN PATENT DOCUMENTS

| | | | |
|---|---|---|---|
| CN | 111553220 | A | 8/2020 |
| KR | 20160142742 | A | 12/2016 |
| WO | 2016045111 | A1 | 3/2016 |

* cited by examiner

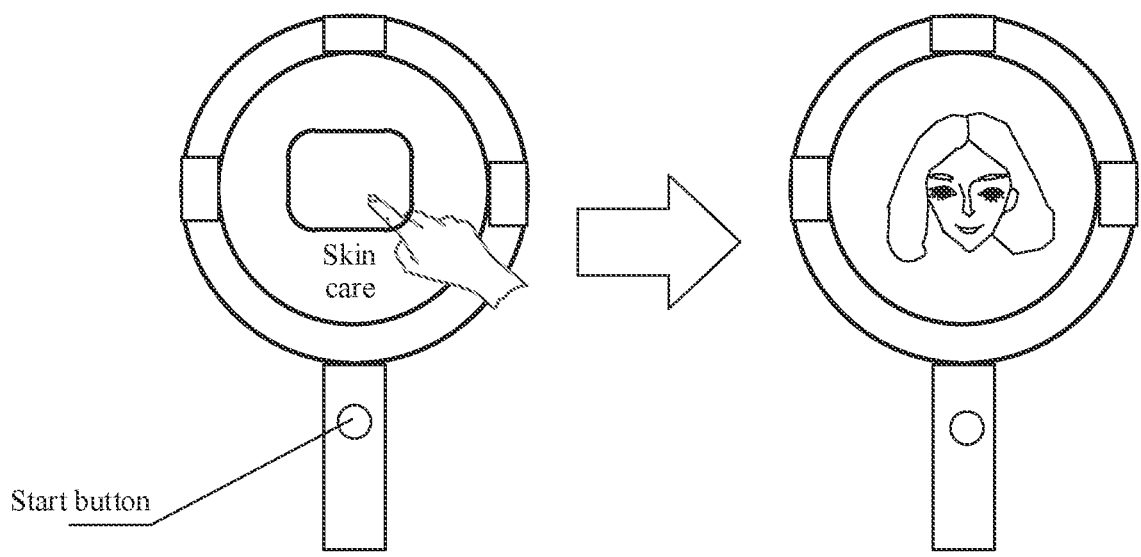
Skin care
Start button
FIG. 2b
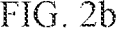
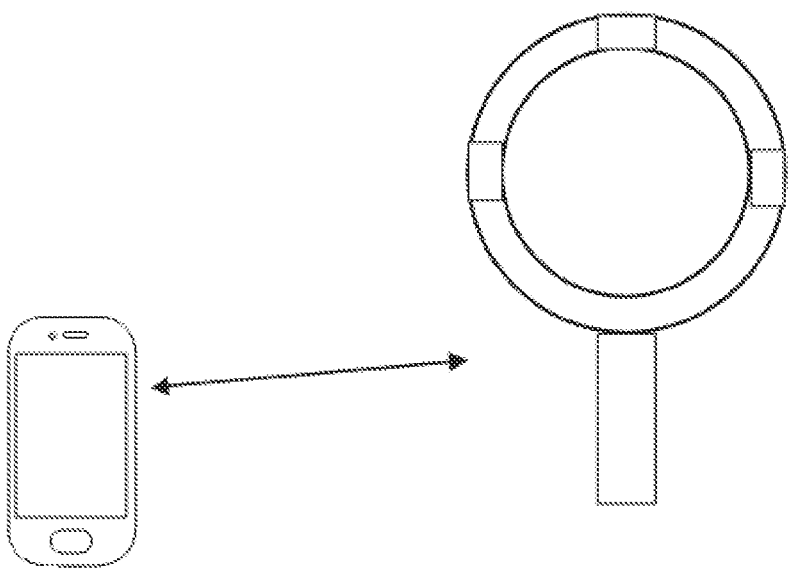
FIG. 3

| Determine, based on target image features corresponding to a plurality of frames of images, skin care actions corresponding to the plurality of frames of images and duration of each skin care action | S3031 |

| Output integrity of a skin care process based on the skin care actions and the duration of each skin care action | S3032 |

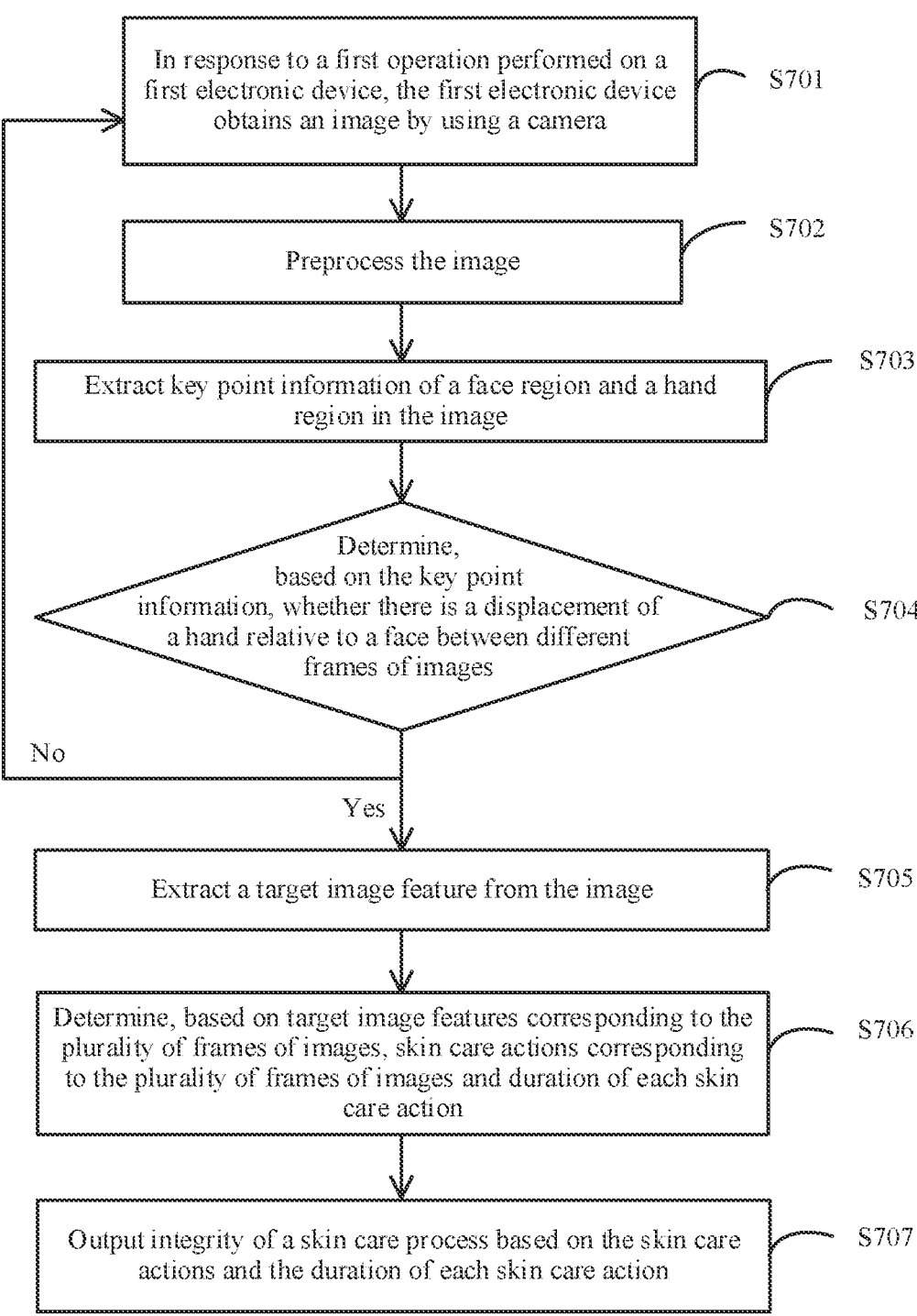

In response to a first operation performed on a
first electronic device, the first electronic device
obtains an image by using a camera                          S701

Preprocess the image                                        S702

Extract key point information of a face region and a hand
region in the image                                         S703

Determine,
based on the key point
information, whether there is a displacement of
a hand relative to a face between different
frames of images                                            S704

No

Yes

Extract a target image feature from the image               S705

Determine, based on target image features corresponding to the
plurality of frames of images, skin care actions corresponding
to the plurality of frames of images and duration of each skin
care action                                                 S706

Output integrity of a skin care process based on the skin care
actions and the duration of each skin care action           S707

FIG. 13

SKIN CARE AUXILIARY METHOD, DEVICE, AND STORAGE MEDIUM

CROSS-REFERENCE TO RELATED APPLICATIONS

This is a U.S. National Stage of International Patent Application No. PCT/CN2021/109140 filed on Jul. 29, 2021, which claims priority to Chinese Patent Application No. 202010857343.5 filed on Aug. 24, 2020. Both of the aforementioned applications are hereby incorporated by reference in their entireties.

TECHNICAL FIELD

This application relates to a smart household, and in particular, to a skin care auxiliary method, a device, and a storage medium.

BACKGROUND

With continuous improvement of living standards, people have higher requirements for skin care and makeup. Therefore, it is crucial to carry out proper skin care/makeup and find skin care/makeup products suitable for themselves.

Currently, to help a user find a makeup product suitable for the user, by analyzing a captured try makeup image of a makeup tester, an action behavior of a simulated actual makeup process of the makeup tester is obtained, and image processing is performed on the try makeup image for virtual makeup, to obtain a virtual makeup effect of the makeup tester. In this way, the user can select a suitable makeup product based on the virtual makeup effect. However, this solution cannot guide users' daily skin care.

SUMMARY

This application provides a skin care auxiliary method, a device, and a storage medium, to guide a user's skin care.

According to a first aspect, an embodiment of this application provides a skin care auxiliary method, applied to a first electronic device having a camera. First, in response to a first operation performed on the first electronic device, obtaining by the first electronic device, an image by using the camera, where the image includes a hand region and a face region, and the first operation is used to indicate a start of a skin care process; extracting a target image feature from the image, where the target image feature is a feature related to the hand region and the face region; and then, outputting integrity of the skin care process based on target image features corresponding to a plurality of frames of images, where the plurality of frames of images are images generated in a time sequence in the skin care process. Presenting the integrity of the skin care process can help a user understand whether a skin care action and skin care time of the user in the skin care process are complete and so on, to assist the user in skin care and provide guidance for the user.

In a possible implementation, the outputting integrity of the skin care process based on target image features corresponding to a plurality of frames of images may include: determining, based on the target image features corresponding to the plurality of frames of images, skin care actions corresponding to the plurality of frames of images and duration of each skin care action; and outputting the integrity of the skin care process based on the skin care actions and the duration of each skin care action.

In the foregoing process, first, the skin care actions and the duration of the skin care actions are determined based on the target image features, and further, the integrity of the skin care process is output based on the skin care actions and the duration of each skin care action. This provides a specific implementation means.

Optionally, the determining, based on the target image features corresponding to the plurality of frames of images, skin care actions corresponding to the plurality of frames of images and duration of each skin care action may include: determining, based on the target image features corresponding to the plurality of frames of images and a pre-trained classifier, the skin care actions corresponding to the plurality of frames of images; and determining duration of the skin care action.

In the foregoing process, the target image feature is used as an input parameter of the pre-trained classifier, and output of the classifier is a skin care action corresponding to the input target image feature. When the classifier identifies a next skin care action, it can be understood that a current skin care action ends. A period of time ranging from first-time identification of the current skin care action to identification of the next skin care action is the duration of the current skin care action.

In a possible implementation, after the determining the duration of the skin care action, the skin care auxiliary method may further include: if the duration of the skin care action is greater than preset duration, prompting a user to perform a next skin care action; or if the duration of the skin care action is less than preset duration, prompting a user to continue the skin care action.

In the foregoing process, for each skin care action, duration for which each skin care action should last is set, that is, the preset duration. If the duration is less than the preset duration, it is considered that the skin care action is incomplete, and the user is prompted to continue the skin care action. If the duration is greater than the preset duration, it is considered that the skin care action is sufficient, and the user is prompted to perform the next skin care action, so that the user can determine a subsequent action, which further improves user experience.

In a possible implementation, duration corresponding to a prompt is a preset value, and the prompt automatically disappears after the duration of the prompt is greater than the preset value. In the skin care process, the user pays attention to using a hand to perform skin care. Therefore, for the prompt and the like, setting the corresponding duration and another automatic means reduces manual intervention, further improving user experience.

In a possible implementation, after the determining skin care actions corresponding to the plurality of frames of images, the skin care auxiliary method further includes: detecting whether the skin care action is standard; and if the skin care action is nonstandard, prompting a standard action corresponding to the skin care action.

In the foregoing process, by detecting standardization of the skin care action, it is determined whether to display a corresponding standard action, to guide the user when a problem occurs during skin care of the user.

In a possible implementation, the outputting the integrity of the skin care process based on the skin care actions and the duration of each skin care action may include: determining the integrity of the skin care process based on the skin care actions and the duration and the preset duration of each skin care action; and outputting the integrity of the skin care process.

In a possible implementation, the extracting a target image feature from the image may include: if it is determined that there is a displacement of the hand relative to the face between different frames of images, extracting the target image feature from the image.

In the foregoing process, before the target image feature is extracted, it is first determined whether there is the displacement of the hand relative to the face in the image. The target image feature is extracted from the image only when there is the displacement of the hand relative to the face in the image. Otherwise, the image is discarded.

In a specific implementation, the determining that there is a displacement of the hand relative to the face between different frames of images may include: extracting key point information of the face region and the hand region in the image; and determining, based on the key point information, that there is the displacement of the hand relative to the face between the different frames of images.

Further, the determining, based on the key point information, that there is the displacement of the hand relative to the face between the different frames of images includes at least one of the following:

when a relative location distance between a hand key point and a face key point changes between the different frames of images, determining that there is the displacement of the hand relative to the face between the different frames of images; and when location information of the hand key point between the different frames of images changes, determining that there is the displacement of the hand relative to the face between the different frames of images.

In the foregoing process, two specific implementations of determining that there is the displacement of the hand relative to the face are provided: One implementation is based on a change of the relative location distance between the hand key point and the face key point; and the other implementation is based on a change of the location information of the hand key point.

In a possible implementation, the outputting the integrity of the skin care process may include: displaying the integrity of the skin care process by using at least one display type among a graph, a diagram, and scoring. Herein, several specific display types of the integrity are provided.

Optionally, the diagram includes circles corresponding to different skin care actions, and integrity of the circle is used to indicate integrity of a corresponding skin care action.

Further, the skin care auxiliary method may further include: displaying skin care details of a corresponding circle in response to a second operation performed on the circle. For example, the user taps or double-taps (that is, performs the second operation on) the circle, and the electronic device displays the skin care details of the corresponding circle in response to the tap or double-tap action.

In a possible implementation, the integrity of the skin care process is included in an analysis report. In this case, the outputting integrity of the skin care process includes: displaying a virtual button, where the virtual button is used to indicate the analysis report; and displaying content of the analysis report in response to a third operation performed on the virtual button.

In a possible implementation, the outputting integrity of the skin care process includes: sending the integrity of the skin care process to a second electronic device for displaying the integrity by the second electronic device. In this implementation, a display limitation of the first electronic device is considered, for example, the display screen of the smart mirror is small. In this case, the integrity is sent to the second electronic device, for example, an electronic device whose display screen is relatively large such as a mobile phone, and the second electronic device displays the integrity. In addition to considering an area of the display screen, the smart mirror is relatively fixed, which is inconvenient to carry. However, a portable device such as the mobile phone may be carried with the user, so that the user can view the integrity of the skin care process anytime and anywhere.

In a possible implementation, after the outputting integrity of the skin care process based on target image features corresponding to a plurality of frames of images, the skin care auxiliary method further includes: outputting, based on the integrity, a policy for giving skin care guidance for the user. Based on the integrity, the user may understand details of the current skin care process of the user, for example, whether there is a problem in the skin care process. Further, a corresponding policy is output based on the problem, to give skin care guidance for the user.

Optionally, the outputting a policy for giving skin care guidance for the user may include: outputting, in a form of a picture and/or a video, the policy for giving skin care guidance for the user.

In a possible implementation, after the obtaining, by the first electronic device, an image by using the camera, the skin care auxiliary method may further include: preprocessing the image, where the preprocessing includes at least one of cropping, scaling, and rotating. Correspondingly, the extracting a target image feature from the image includes: extracting the target image feature from a preprocessed image.

In the foregoing process, the preprocessing such as cropping, scaling, and rotating reduces a runtime of the skin care auxiliary method and power consumption.

According to a second aspect, an embodiment of this application provides a skin care auxiliary apparatus, applied to a first electronic device having a camera. The skin care auxiliary apparatus includes:

an obtaining module, configured to: in response to a first operation performed on the first electronic device, obtain an image by using the camera of the first electronic device, where the image includes a hand region and a face region, and the first operation is used to indicate a start of a skin care process:

an extracting module, configured to extract a target image feature from the image, where the target image feature is a feature related to the hand region and the face region; and an output module, configured to output integrity of the skin care process based on target image features corresponding to a plurality of frames of images, where the plurality of frames of images are images generated in a time sequence in the skin care process.

The skin care auxiliary apparatus can implement the solutions according to any one of the foregoing implementations by using the obtaining module, the extracting module, and the output module. Implementation principles and technical effects of the skin care auxiliary apparatus are similar to those described above. Details are not described herein again.

In some embodiments, the output module includes:

a determining unit, configured to determine, based on the target image features corresponding to the plurality of frames of images, skin care actions corresponding to the plurality of frames of images and duration of each skin care action; and an output unit, configured to output the integrity of the skin care process based on the skin care actions and the duration of each skin care action.

In some embodiments, the determining unit is specifically configured to determine, based on the target image features corresponding to the plurality of frames of images and a pre-trained classifier, the skin care actions corresponding to the plurality of frames of images; and determine the duration of the skin care actions.

In some embodiments, the output unit is further configured to: after the determining unit determines the duration of the skin care action, if the duration of the skin care action is greater than preset duration, prompt the user to perform a next skin care action; or if the duration of the skin care action is less than the preset duration, prompt the user to continue the skin care action.

In some embodiments, duration corresponding to a prompt is a preset value, and the prompt automatically disappears after the duration of the prompt is greater than the preset value.

In some embodiments, the output unit is further configured to: after the determining unit determines the skin care actions corresponding to the plurality of frames of images, detect whether the skin care action is standard; and if the skin care action is nonstandard, prompt a standard action corresponding to the skin care action.

In some embodiments, the output unit is specifically configured to determine the integrity of the skin care process based on the skin care actions and the duration and the preset duration of each skin care action; and output the integrity of the skin care process.

In some embodiments, the extracting module is specifically configured to: if it is determined that there is a displacement of the hand relative to the face between different frames of images, extract the target image feature from the image.

In some embodiments, when determining that there is the displacement of the hand relative to the face between the different frames of images, the extracting module is specifically configured to: extract key point information of the face region and the hand region in the image, and determine, based on the key point information, that there is the displacement of the hand relative to the face between the different frames of images.

In some embodiments, when the extracting module determines, based on the key point information, that there is the displacement of the hand relative to the face between the different frames of images, at least one of the following is included:

when a relative location distance between a hand key point and a face key point changes between the different frames of images, determining that there is the displacement of the hand relative to the face between the different frames of images; and when location information of the hand key point between the different frames of images changes, determining that there is the displacement of the hand relative to the face between the different frames of images.

In some embodiments, the output module is specifically configured to display the integrity of the skin care process by using at least one display type among a graph, a diagram, and scoring.

In some embodiments, the diagram includes circles corresponding to different skin care actions, and integrity of the circle is used to indicate integrity of a corresponding skin care action.

In some embodiments, the output module is further configured to display skin care details of the corresponding circle in response to a second operation performed on the circle.

In some embodiments, the integrity of the skin care process is included in an analysis report. In this case, the output module is further configured to display a virtual button, where the virtual button is associated with the analysis report; and display content of the analysis report in response to a third operation performed on the virtual button.

In some embodiments, the output module is specifically configured to send the integrity of the skin care process to a second electronic device for displaying the integrity by the second electronic device.

In some embodiments, the output module is further configured to output, based on the integrity, a policy for giving skin care guidance for the user.

In some embodiments, when outputting the policy for giving skin care guidance for the user, the output module is specifically configured to output, in a form of a picture and/or a video, the policy for giving skin care guidance for the user.

In some embodiments, the extracting module is further configured to preprocess the image, where the preprocessing includes at least one of cropping, scaling, and rotating. Correspondingly, that the extracting module extracts the target image feature from the image is specifically: extracting the target image feature from a preprocessed image.

Based on any one of the foregoing possible implementations, optionally, the first electronic device is a smart mirror.

The integrity may include at least one of whether the skin care action is standard, whether the skin care action is omitted, whether skin care time is sufficient, and the like.

Optionally, the above mentioned classifier may include at least one of the following classifiers:

a support vector machine, a random forest, a decision tree, a neural network, ensemble learning, and the like.

Optionally, the target image feature includes at least one of the following features.

a Euclidean distance between the hand key point and the face key point;

a Manhattan distance between the hand key point and the face key point;

a relative displacement between the hand key point and the face key point;

an optical flow feature;

and the like.

According to a third aspect, an embodiment of this application provides an electronic device, including a camera, a memory, and a processor. The memory stores a computer program that can be executed by the processor. When the processor reads and executes the computer program, the processor is enabled to perform the method according to any one of the foregoing embodiments.

According to a fourth aspect, an embodiment of this application provides a computer-readable storage medium, where the computer-readable storage medium stores a computer program. The computer program includes at least one segment of code, and the at least one segment of code may be executed by a processor to implement the method according to any one of the foregoing embodiments.

According to a fifth aspect, an embodiment of this application further provides a chip, where the chip includes a programmable logic circuit and an input interface. The input interface is configured to obtain to-be-processed data. The logic circuit is configured to perform the method according to any one of the foregoing embodiments on the to-be-processed data. Implementation principles and beneficial effects of the chip are similar to those described above. Details are not described herein again.

According to a sixth aspect, an embodiment of this application further provides a computer program product. When the computer program product runs on an electronic device, the electronic device is enabled to perform the method according to any one of the foregoing embodiments. Implementation principles and beneficial effects of the computer program product are similar to those described above. Details are not described herein again.

These and other aspects of this application are clearer and more comprehensible in the following (plurality of) embodiments.

BRIEF DESCRIPTION OF DRAWINGS

FIG. 2b is a schematic diagram of another beauty mirror application according to an embodiment of this application:

FIG. 3 is an example diagram of a communication system according to an embodiment of this application;

FIG. 13 is a flowchart of a skin care auxiliary method according to still another embodiment of this application;

DESCRIPTION OF EMBODIMENTS

It should be understood that the term "and/or" in this specification describes only an association relationship for describing associated objects and represents that three relationships may exist. For example, A and/or B may represent the following three cases: Only A exists, both A and B exist, and only B exists. "/" indicates an "or" relationship.

A smart mirror integrates a mirror function and an information display function, and interacts with an electronic device by using a built-in communication module, to implement the information display function. The electronic device may be a mobile phone, a smart scale, a server, or the like. For example, the smart mirror interacts with the smart scale, and the smart scale sends currently measured weight data to the smart mirror for display by the smart mirror. Alternatively, through interaction between the smart mirror and the electronic device, a user may read news and the like by using the smart mirror during morning and evening washing, to make full use of a fragmented time. As a specific implementation of the smart mirror, a beauty mirror is mainly used to help the user perform daily skin care and makeup.

Figures 1, 2A:
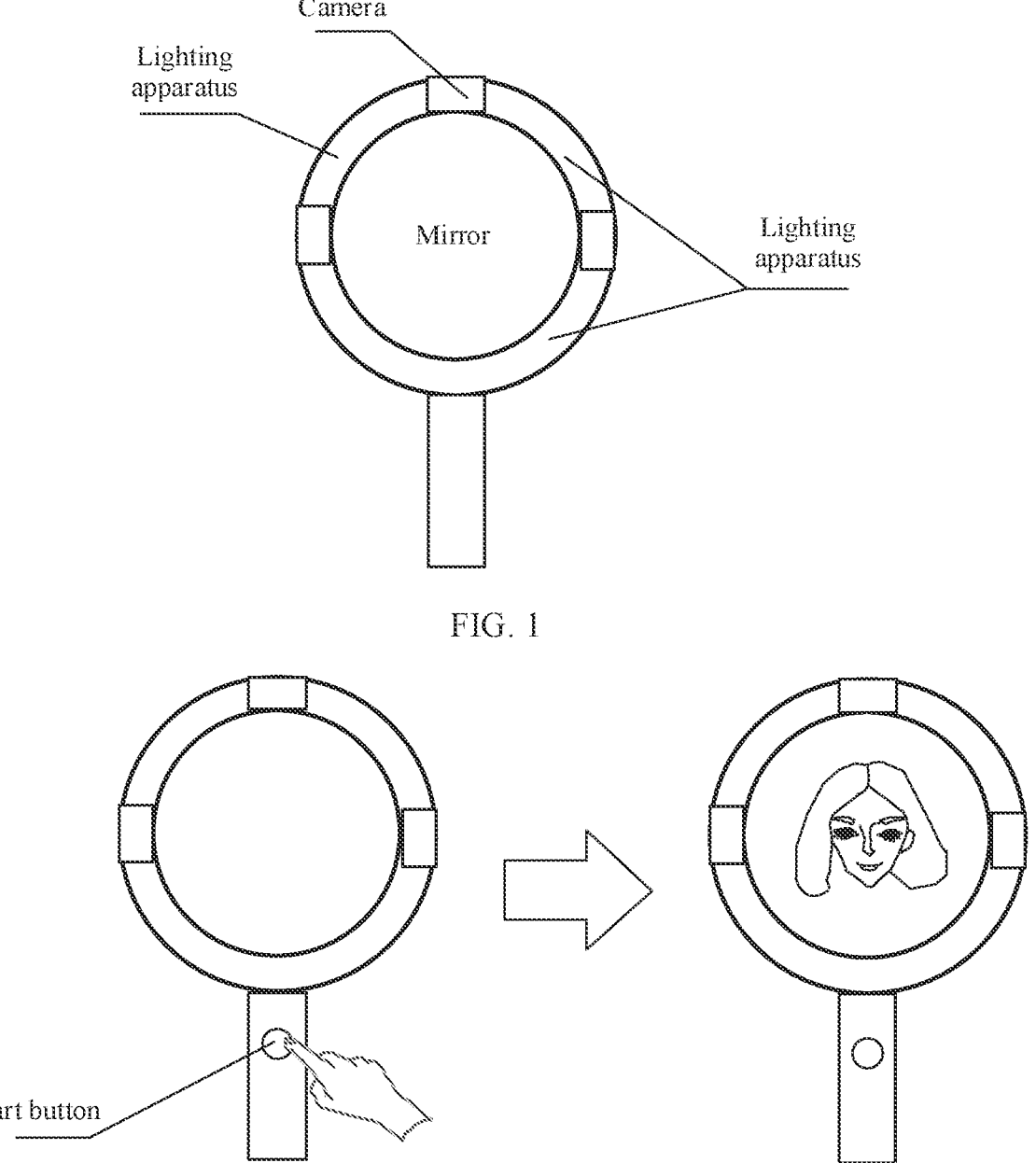
FIG. 1 is an example diagram of an external structure of a beauty mirror.
FIG. 2a is a schematic diagram of a beauty mirror application according to an embodiment of this application.

FIG. 1 is an example diagram of an external structure of a beauty mirror. With reference to FIG. 1, the beauty mirror includes but is not limited to a camera, a mirror surface, a display screen, a lighting apparatus, and the like. A video stream or an image of the user in a process of using a beauty mirror may be obtained by using the camera. The user can understand an image of the user in a skin care process by using the mirror surface. Information may be checked or viewed by using the display screen. The lighting apparatus may provide light so that the user can more clearly view a skin condition and the like. Optionally, in different modes, a mirror function of the beauty mirror may be switched, for example, the beauty mirror is the mirror surface in an image function, and the beauty mirror is the display screen in a display function. Alternatively, the display screen is a part of the mirror surface, that is, the beauty mirror has both the image function and the display function.

In actual application, when the user sits/stands in front of the beauty mirror or passes by the beauty mirror, the beauty mirror can be self-started by using technologies such as infrared. Alternatively, the user taps a start button on the beauty mirror to start the beauty mirror, as shown in FIG. 2a.

In an implementation, the beauty mirror starts when the user presses the start button, starts the camera on the beauty mirror, and obtains an image by using the camera. Alternatively, in another implementation, a beauty application (Application, APP for short) is installed in the beauty mirror. When the user starts a beauty APP named "skin care", the beauty mirror starts the camera by default and starts to obtain an image, as shown in FIG. 2b.

Based on an investigation on a daily skin care process of the user, in the early morning, the user spends approximately 10 minutes on skin care in front of the beauty mirror. Because the user is in a hurry in the morning and only pursues basic steps, the user does not have time for multi-step fine skin care, and a skin care product needs to be fully absorbed before make up. In addition, in the evening, the user spends approximately 25 minutes on skin care in front of the beauty mirror. Because the user has plenty of time in the evening, a large amount of time can be used in the skin care process, for example, ensuring that a facial mask is sufficiently attached to the face, and ensuring a better effect through a cooperation technique.

Based on the foregoing investigation result and a disadvantage that an existing try makeup solution cannot guide skin care of the user, embodiments of this application provide a skin care auxiliary method, a device, and a storage medium. Presenting integrity of the skin care process of the user can help the user understand whether a skin care action and skin care time of the user in the skin care process are complete and so on, to assist the user in skin care and provide guidance for skin care of the user.

It should be noted that, the skin care auxiliary solution provided in this embodiment of this application may be performed by a smart mirror, or may be performed by an electronic device having a specific computing power, for example, a mobile phone, a computer, a server, or a server cluster.

For example, if the electronic device other than the smart mirror is used as the execution body, the smart mirror sends the video stream or the image obtained by the smart mirror to the execution body, and the execution body analyzes the video stream or the image to perform the skin care auxiliary method. A specific scenario diagram is shown in FIG. 3. FIG. 3 is an example diagram of a communication system according to an embodiment of this application. As shown in FIG. 3, the communication system includes a mobile phone and a smart mirror, and near field communication is performed between the mobile phone and the smart mirror, to implement technical solutions provided in the following embodiments of this application. In this example diagram, for example, an electronic device is the mobile phone for description. However, this embodiment of this application is not limited thereto.

Alternatively, the smart mirror is used as an execution body. Specifically, after obtaining a video stream or an image of a user in a skin care process, the smart mirror analyzes the video stream or the image, and performs a skin care auxiliary method.

Figure 4:
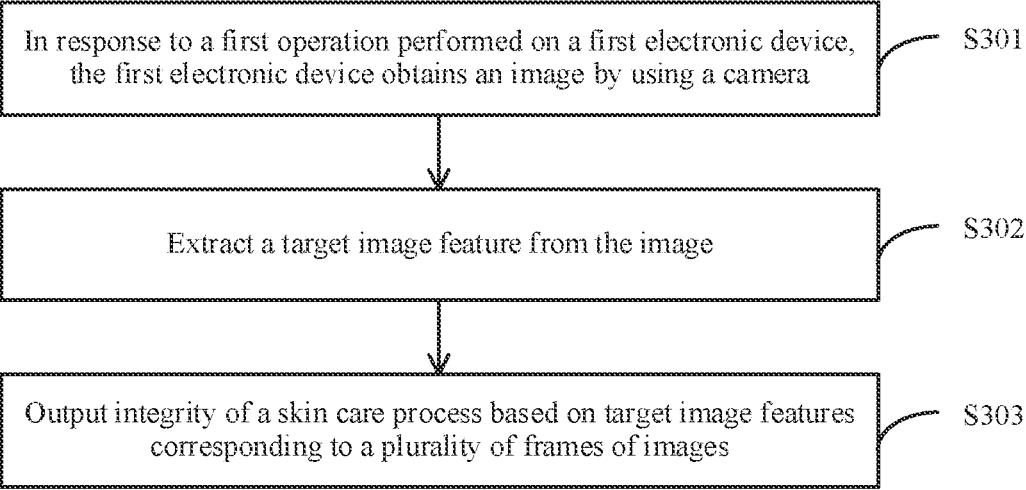
FIG. 4 is a flowchart of a skin care auxiliary method according to an embodiment of this application.

FIG. 4 is a flowchart of a skin care auxiliary method according to an embodiment of this application. An embodiment of this application provides a skin care auxiliary method, which is applied to a first electronic device with a camera, for example, the foregoing smart mirror. As shown in FIG. 4, the skin care auxiliary method includes:

S301: In response to a first operation performed on the first electronic device, the first electronic device obtains an image by using the camera.

The image includes a hand region and a face region. The first operation is used to indicate a start of a skin care process. With reference to FIG. 2a and FIG. 2b, the smart mirror detects a first operation of a user, responds to the first operation, and starts to obtain the image. The first operation may be an operation of tapping a start button on the smart mirror by the user. Alternatively, the first operation may be an operation of tapping or double tapping or touching and holding an installed beauty APP on the smart mirror by the user, or the like.

In actual application, after obtaining a video stream of the user in the skin care process and/or periodically obtaining an image, the smart mirror detects whether each frame of image includes the hand region and the face region, where the video stream includes a plurality of frames of images. It can be understood that the skin care process refers to care operations performed by the user on the face region by using the hand region, including care operations performed on different parts of the face region, such as applying toner, milk, and cream to the forehead, the face, the chin, and the like region, and applying eye cream to the eyes. Therefore, whether the image includes the hand region and the face region needs to be first detected, and an image that does not include the hand region or the face region needs to be screened out.

Figure 5A:
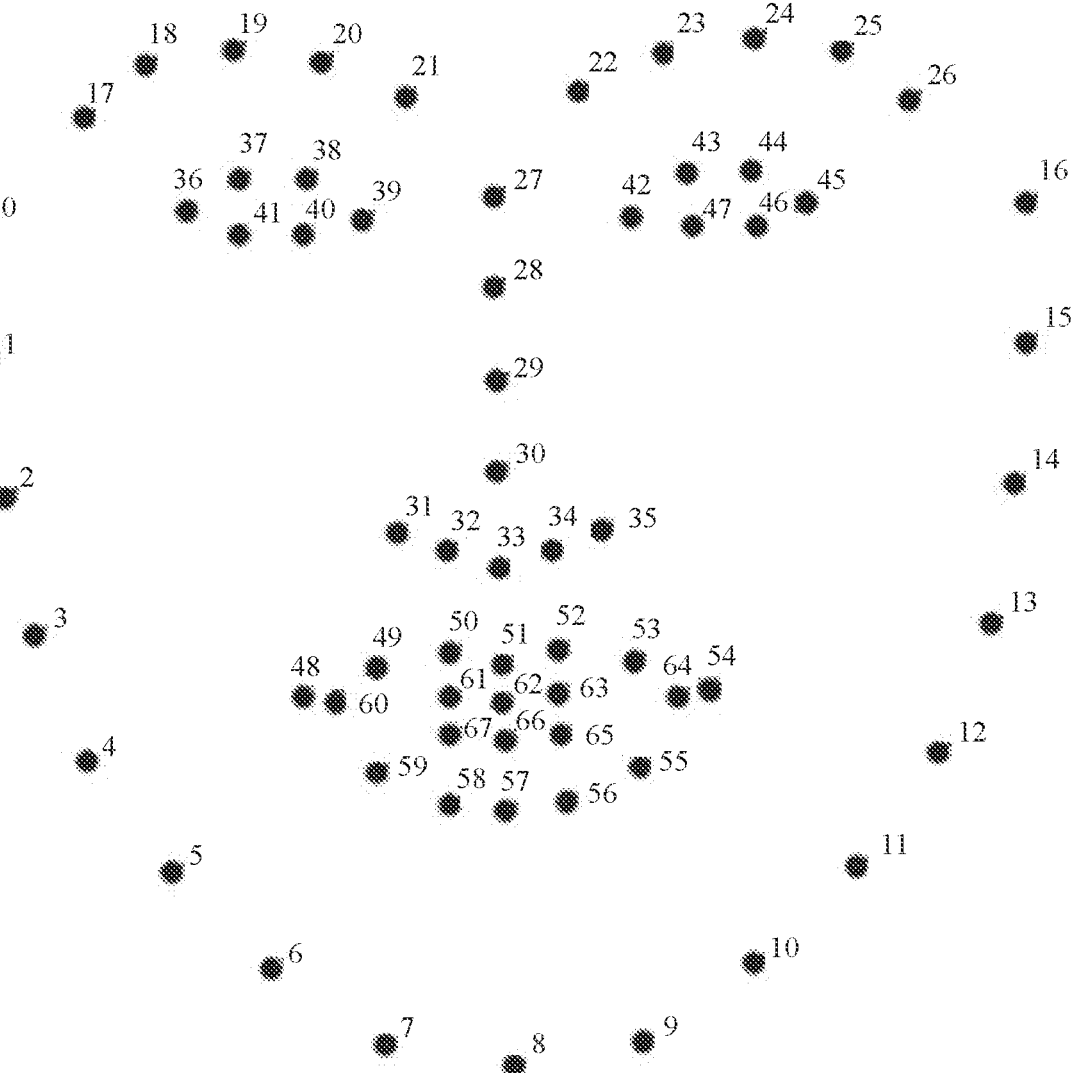
FIG. 5a is an example diagram of key points of a face region.
Figures 5B, 6:
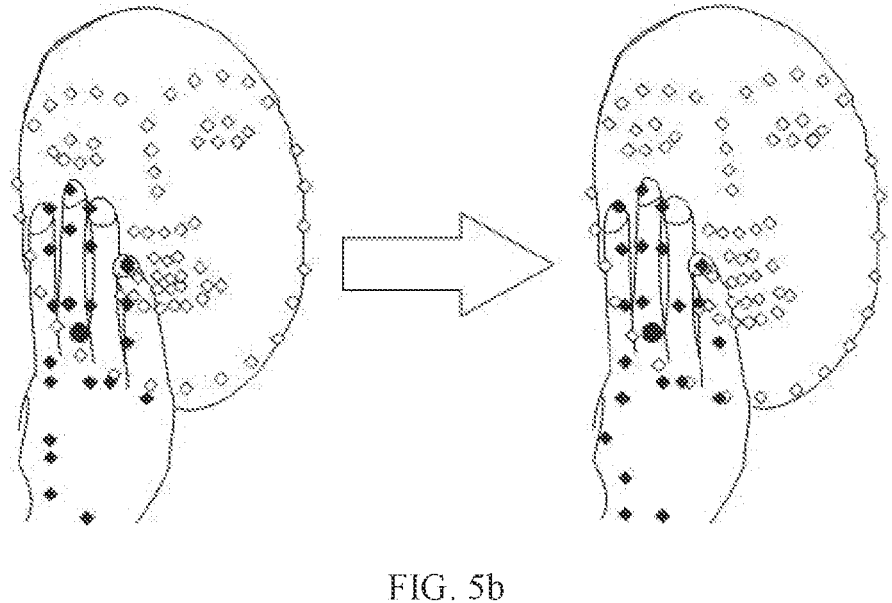
FIG. 5b is an example diagram of key points of a hand region and key points of a face region according to an embodiment of this application.
FIG. 6 is a flowchart of a skin care auxiliary method according to another embodiment of this application.

Specifically, the smart mirror may detect, by using a face detection algorithm or a face key point detection algorithm, whether the image includes the face region, and detect, by using a hand detection algorithm or a hand key point detection algorithm, whether the image includes the hand region. For specific descriptions of the face detection algorithm and the hand key point detection algorithm, refer to related technologies. Details are not described herein. By detecting the image by using the face key point detection algorithm, key point information of the face region may be obtained. For example, information about 68 key points of the face region shown in FIG. 5a includes key points in locations such as an eye circumference, a mouth circumference, a nose wing, and a face outline. By extracting the key points, the face outline may be sketched out. FIG. 5b shows key points of the face and a hand.

S302: Extract a target image feature from the image.

The target image feature is a feature related to the hand region and the face region.

For the image that includes the hand region and the face region, the target image feature included in the image is further extracted, where the target image feature is the feature related to the hand region and the face region. Because an action of the hand region relative to the face region needs to be analyzed, the feature related to the hand region and the face region is extracted herein.

In an example, the target image feature may include at least one of the following features:

a Euclidean distance between a hand key point and a face key point;

a Manhattan distance between the hand key point and the face key point;

a relative displacement between the hand key point and the face key point;

an optical flow feature;

and the like.

For descriptions of the Euclidean distance, the Manhattan distance, the relative displacement, and the optical flow feature, refer to related technologies. Details are not described in this embodiment of this application.

The 68 key points in the face region and 21 key points in the hand region (including key points in a joint and a fingertip) are still used as an example. The Euclidean distance may be a Euclidean distance between a preset key point in the face region and a preset key point in the hand region. Selection of the preset key point is not limited in this embodiment of this application, and selection may be specifically performed based on an actual requirement or historical experience.

S303. Output integrity of the skin care process based on target image features corresponding to the plurality of frames of images.

The plurality of frames of images are images generated in a time sequence in the skin care process.

For example, the skin care process corresponds to a skin care action. Based on the target image features corresponding to the plurality of frames of images generated in a time sequence in the skin care process, information such as the skin care action may be obtained, and the information may reflect integrity of the skin care process to some extent. For example, if the user forgets to apply eye cream, the output integrity of the skin care process indicates that this skin care action is omitted. Alternatively, the output integrity of the skin care process does not include this skin care action, and the user may determine, based on the output integrity, that this skin care action of applying eye cream is omitted. For example, usually, after washing the face, the user needs to first apply, by using the hand, a makeup cotton, a beauty blender, and the like, astringent toner/smoothing toner to the face for cleaning; then apply eye cream under the eyes and to the eyelids by using a finger pulp for anti-aging; and finally apply facial essence, milk, facial cream, sunscreen, base, and the like for whitening, where sunscreen and base are mainly applied in a daytime. Because actions of washing the face and applying astringent toner/smoothing toner are similar to an action of applying milk or cream, which are all massages on the face region, the actions of applying toner, milk, and cream may be defined herein as skin care actions A. An action of applying eye cream is defined as a skin care action B. A complete skin care process corresponds to: the skin care action A—the skin care action B—the skin care action A.

In a specific implementation, the smart mirror may output the integrity of the skin care process by using a display screen, that is, display the integrity of the skin care process. In this way, the user can understand the skin care process of the user based on the integrity, to refine or improve the skin care process.

In another specific implementation, when the smart mirror does not have a display function, the smart mirror may display the integrity of the skin care process by using another electronic device that has a display function and that communicates with the smart mirror. In this case, the smart mirror sends the output integrity of the skin care process to the another electronic device (that is, a second electronic device) for displaying by the another electronic device.

The integrity of the skin care process is set based on historical big data or an actual requirement, and a specific meaning of the integrity of the skin care process is not limited in this embodiment of this application.

According to the skin care auxiliary method provided in this embodiment of this application, first, in response to the first operation performed on the first electronic device, the first electronic device obtains the image by using the camera, where the image includes the hand region and the face region and the first operation is used to indicate the start of the skin care process, and extracts the target image feature from the image, where the target image feature is the feature related to the hand region and the face region; and then outputs the integrity of the skin care process based on the target image features corresponding to the plurality of frames of images, where the plurality of frames of images are the images generated in the time sequence in the skin care process. Outputting the integrity of the skin care process can help the user understand whether the skin care action and skin care time of the user in the skin care process are complete and so on, to assist the user in skin care and provide guidance for the user.

Considering that when the user performs skin care in front of the beauty mirror, a correct skin care action can greatly promote skin absorption of a skin care product. Therefore, on a basis of the foregoing embodiment, the integrity may include at least one of whether the skin care action is standard, whether the skin care action is omitted, and whether the skin care time is sufficient. A description of whether the skin care action is omitted is the same as related descriptions in S303 in the foregoing embodiment. Details are not described herein again. In addition, whether the skin care action is standard and whether the skin care time is sufficient are similar to related descriptions about whether the skin care action is omitted. Details are not described herein again.

For example, because the integrity of the skin care process output by the electronic device is obtained based on the target image features corresponding to the plurality of frames of images, and the plurality of frames of images correspond to one piece of duration, whether the skin care time is sufficient can be reflected by comparing the duration with total preset skin care duration. In this case, the outputting the integrity of the skin care process based on the target image features corresponding to the plurality of frames of images may include: outputting the integrity of the skin care process based on the target image features corresponding to the plurality of frames of images and the duration of the skin care process.

In addition, as to whether the skin care action is standard, it can be understood that, within duration of a skin care action, a face region on which the skin care action acts and a skin care technique may be learned based on an image within the duration. Based on the face region on which the skin care action acts and the skin care technique, it can be determined whether the skin care action is standard. In this case, the outputting the integrity of the skin care process based on the target image features corresponding to the plurality of frames of images may include: outputting the integrity of the skin care process based on the target image features corresponding to the plurality of frames of images, the face region on which the skin care action acts, and the skin care technique.

The following further describes S303 shown in FIG. 4 with reference to FIG. 6. With reference to FIG. 6, S303 may include:

S3031: Determine, based on the target image features corresponding to the plurality of frames of images, skin care actions corresponding to the plurality of frames of images and duration of each skin care action.

In some embodiments, this step may be specifically: determining, based on the target image features corresponding to the plurality of frames of images and a pre-trained classifier, the skin care actions corresponding to the plurality of frames of images; and determining the duration of the skin care action.

The classifier is a pre-trained model used to classify skin care actions. The classifier may specifically include at least one of the following classifiers; a support vector machine (support vector machine, SVM), a random forest, a decision tree, a neural network, ensemble learning (adaboost), and the like.

Specifically, the target image features corresponding to the plurality of frames of images are used as input parameters of the classifier, which are processed by the classifier to obtain the skin care actions corresponding to the target image features, namely, output of the classifier. In an example, the classifier may distinguish between the skin care action A, the skin care action B, and a skin care action C. Related descriptions of the skin care action A and the skin care action B are described above, and the skin care action C indicates that no skin care is performed.

After the skin care action is determined, the duration of the skin care action may be determined based on at least one frame of image corresponding to the skin care action. Alternatively, a skin care action output by the classifier for the first time is used as a starting moment corresponding to the skin care action, a next skin care action output by the classifier for the first time is used as an end moment corresponding to the skin care action and a starting moment of the next skin care action, and the like until the skin care process ends, to obtain the duration of each skin care action.

Figure 7A:
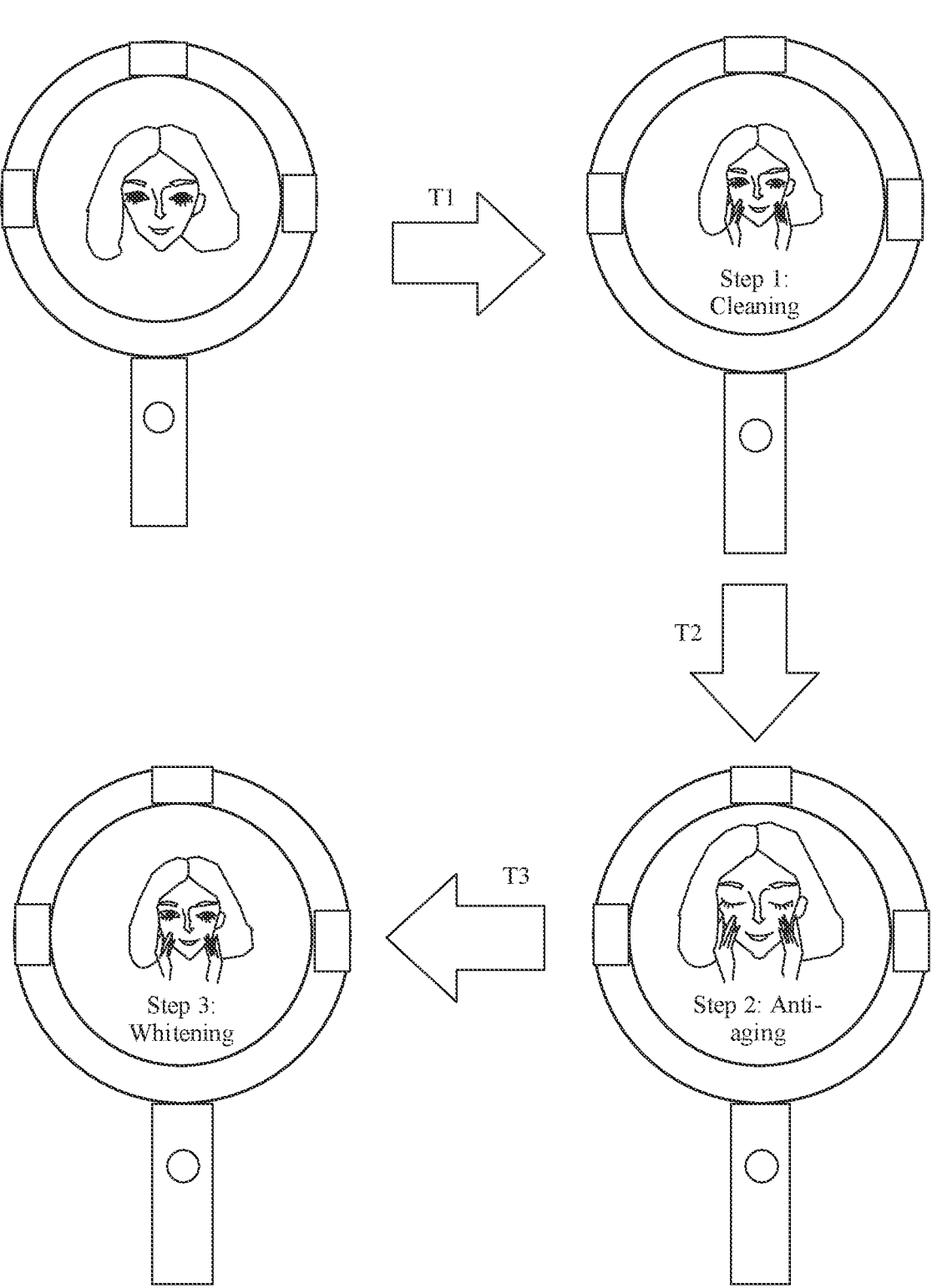
FIG. 7a is an example diagram of a screen of a skin care process according to an embodiment of this application.
Figure 7B:
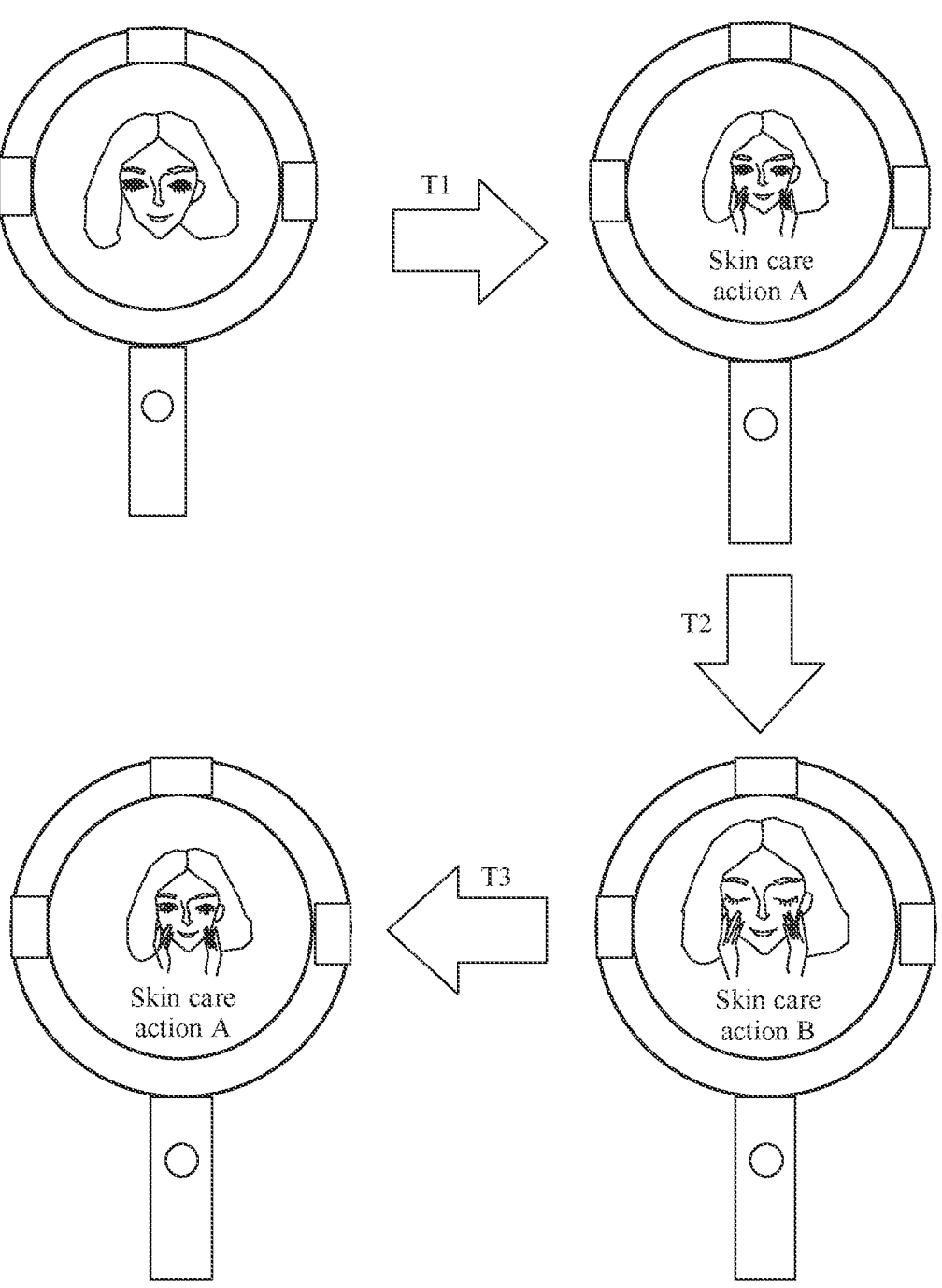
FIG. 7b is an example diagram of another screen of a skin care process according to an embodiment of this application.

In a specific application, preset duration may be set for each skin care action. If duration of a skin care action is greater than preset duration corresponding to the skin care action, the user is prompted to proceed to a next step. For example, with reference to FIG. 7a, if the beauty mirror still does not detect a skin care action after preset duration T1 after the beauty mirror starts, the user is prompted to perform step 1: cleaning; after continuous cleaning duration of the user reaches preset duration T2, the user is prompted to perform step 2: anti-aging; and after continuous anti-aging duration of the user reaches preset duration T3, the user is prompted to perform step 3: whitening. Alternatively, with reference to FIG. 7b, if the beauty mirror still does not detect a skin care action after duration T1 after the beauty mirror starts, the user is prompted to perform the skin care action A: after continuous duration of the skin care action A of the user reaches preset duration T2, the user is prompted to perform the skin care action B; and after continuous duration of the skin care action B of the user reaches preset duration T3, the user is prompted to perform the skin care action A.

It should be noted that the foregoing provides only two prompt examples. However, this application is not limited thereto, and may further notify the user of a current skin care action in another prompt manner.

Figure 8A:
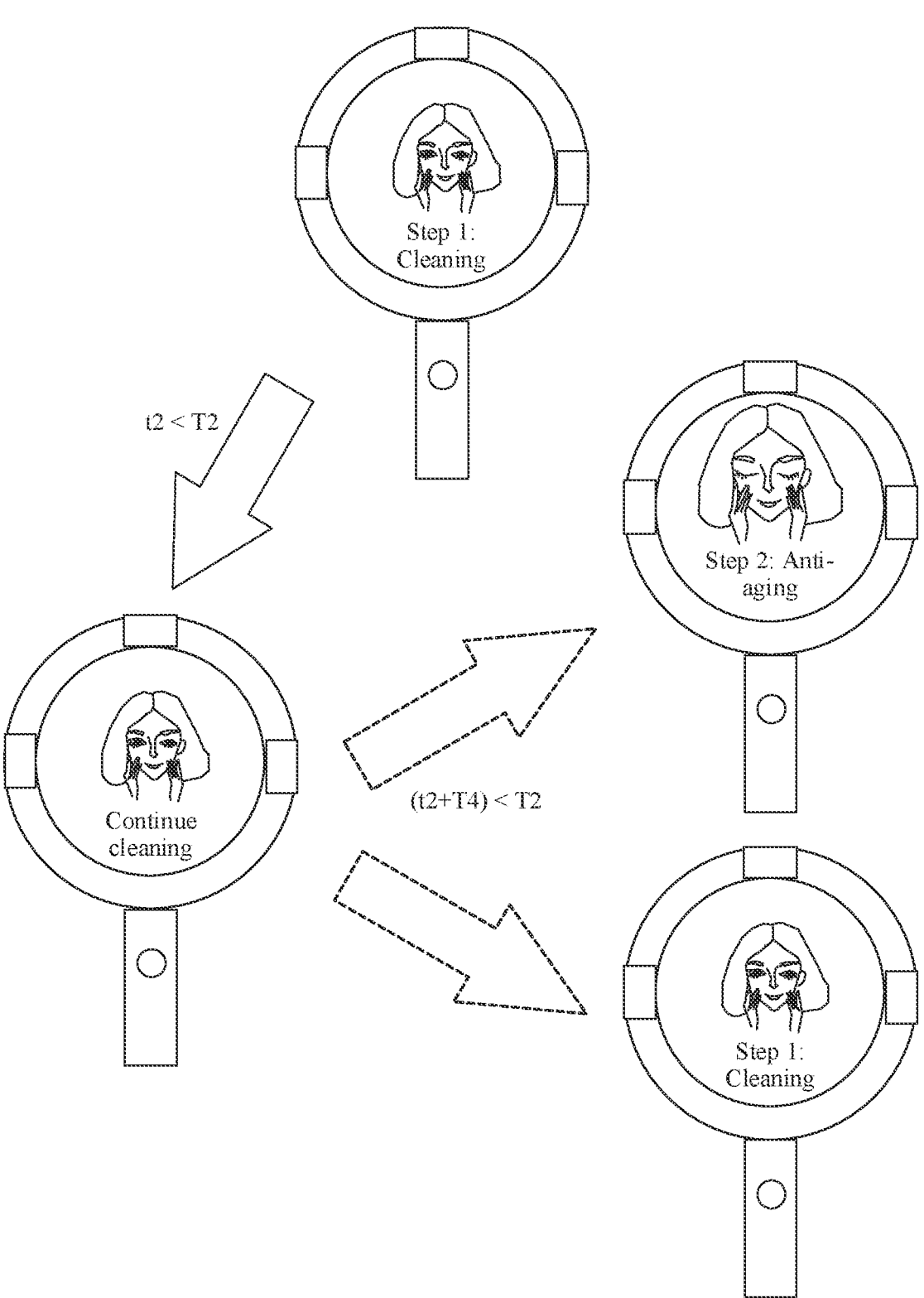
FIG. 8a is an example diagram of still another screen of a skin care process according to an embodiment of this application.

Further, when duration of a skin care action is less than preset duration, the user may be prompted to continue the current skin care action by using a display screen on the smart mirror. For example, with reference to FIG. 8a, the user is performing step 1: cleaning. Because of limited time in the morning, duration of step 1: cleaning performed by the user may be short, and then step 2: anti-aging is started, that is, the continuous cleaning duration t2 of the user is less than the preset duration T2. In this case, prompt content similar to "continuing to clean" is displayed on the display screen, and automatically disappears after display duration of the prompt content reaches preset duration T4. In this case, (t2+T2)<T4, there are two cases for an ongoing skin care action performed by the user:

(1) go back to step 1: cleaning; and
(2) continue step 2: anti-aging.

Figure 8B:
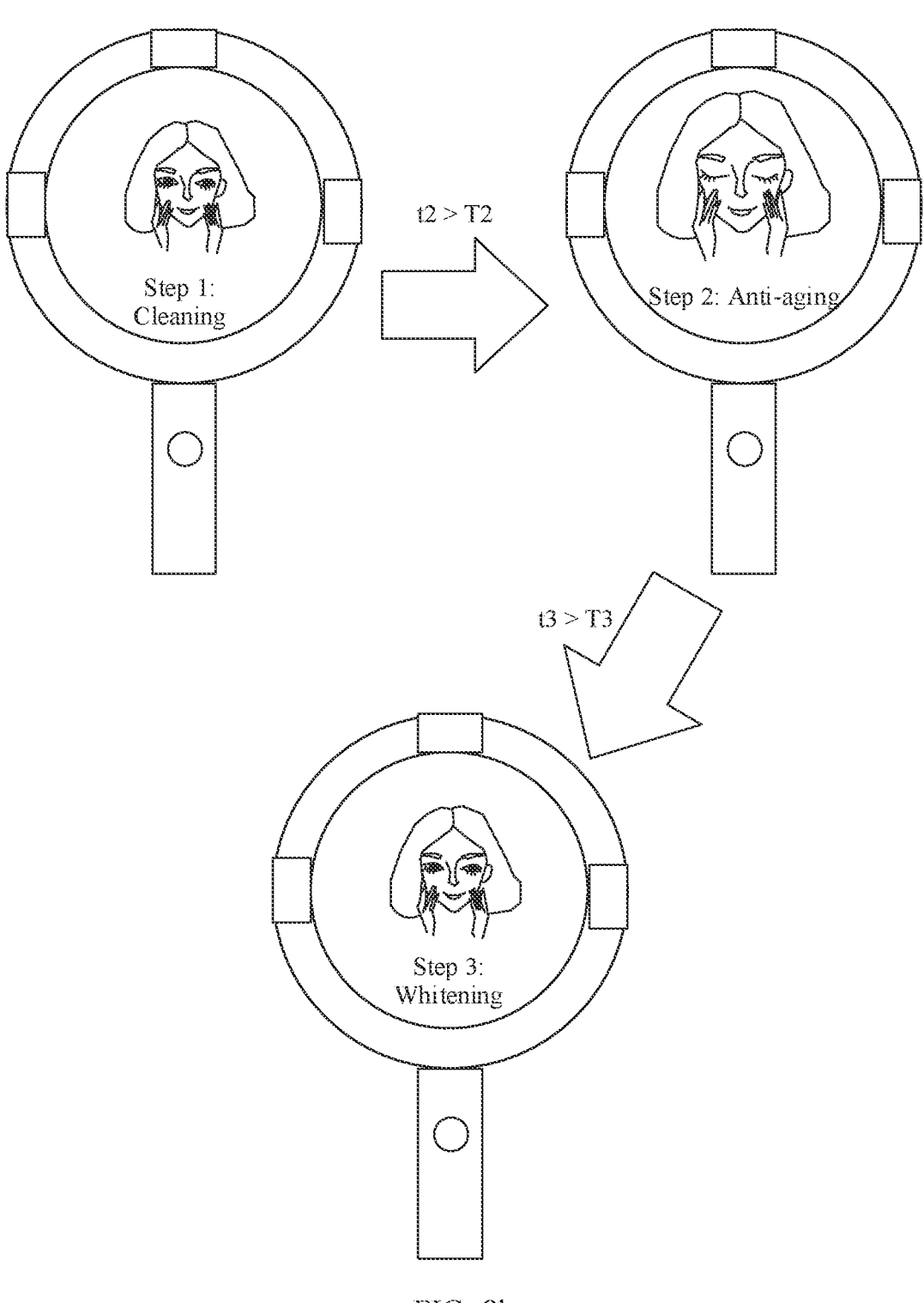
FIG. 8b is an example diagram of still another screen of a skin care process according to an embodiment of this application.

Alternatively, if duration of a skin care action is greater than preset duration, the user is prompted to perform a next skin care action. For example, with reference to FIG. 8b, the user is performing step 1: cleaning, and duration t2 of step 1: cleaning performed by the user is greater than the preset duration T2. In this case, the display screen displays prompt content of "step 2: anti-aging". Duration t3 of step 2; anti-aging performed by the user is greater than the preset duration T3. In this case, the display screen displays prompt content of "step 3: whitening".

Figure 8C:
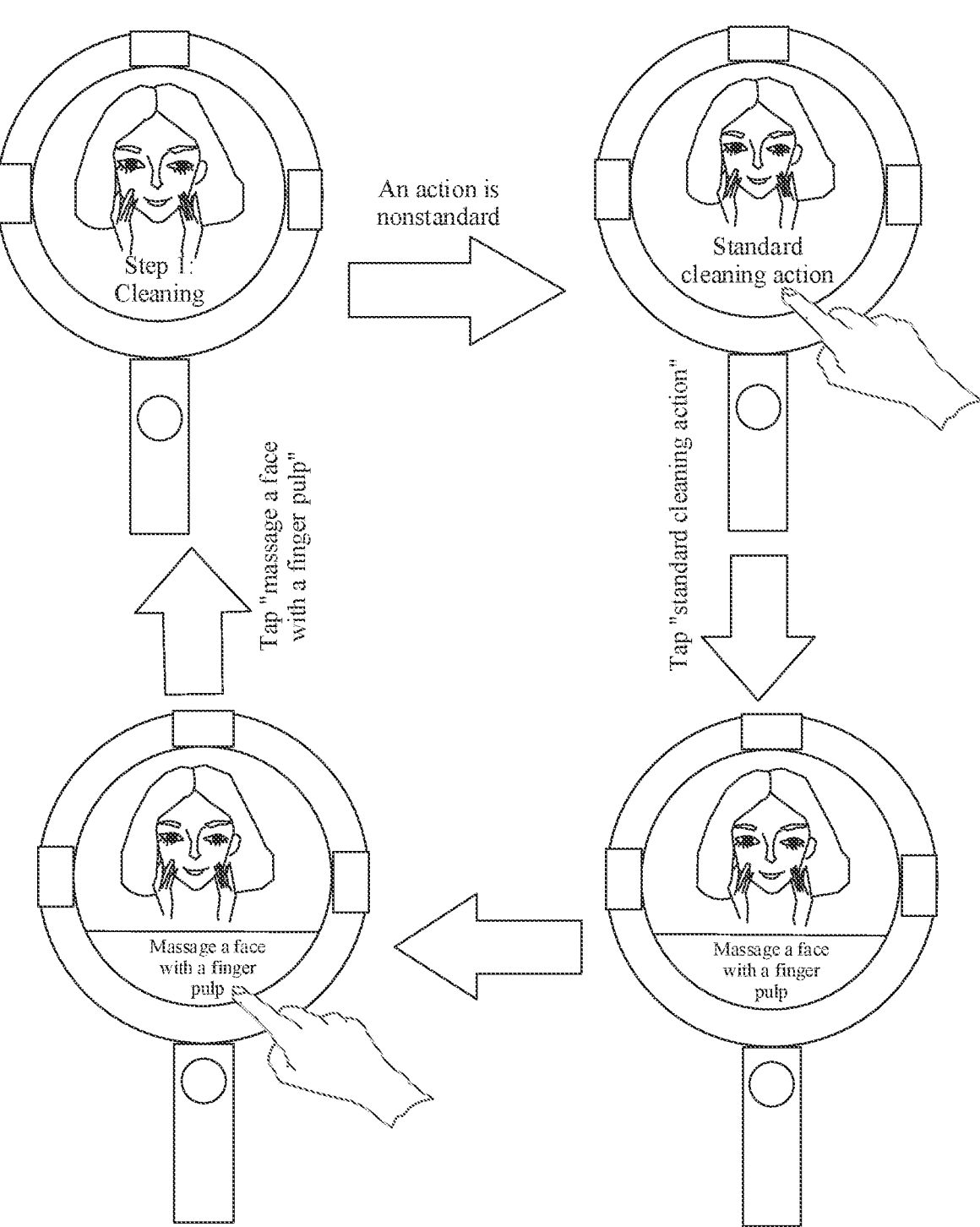
FIG. 8c is an example diagram of still another screen of a skin care process according to an embodiment of this application.
Figure 8D:
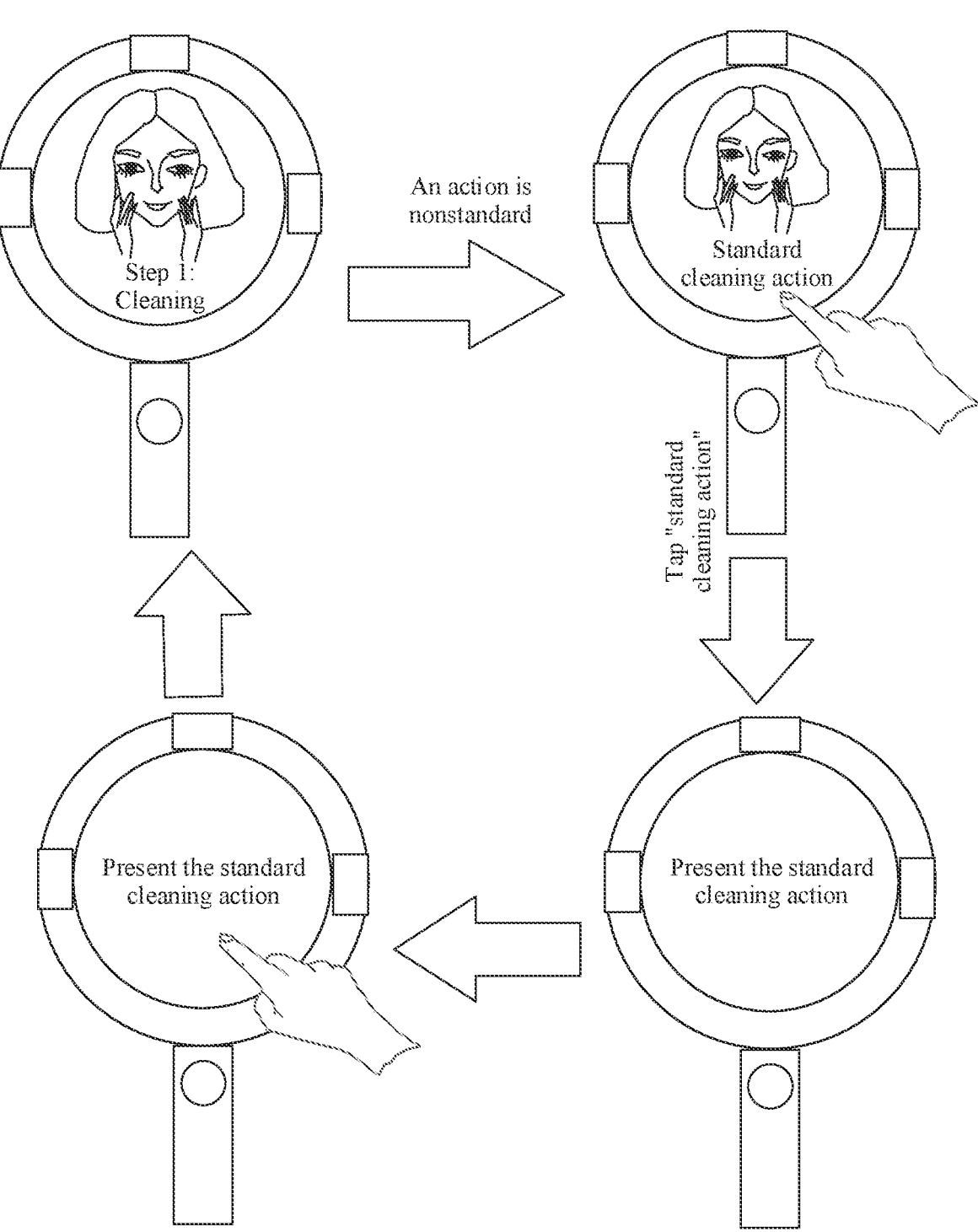
FIG. 8d is an example diagram of still another screen of a skin care process according to an embodiment of this application.

In some embodiments, the smart mirror may further detect whether a skin care action is standard, and when the skin care action is nonstandard, prompt the user of a standard action corresponding to the skin care operation. For example, as shown in FIG. 8c, the user is performing step 1: cleaning. In this case, the smart mirror detects that the skin care action is nonstandard, and prompts, by using the display screen, the user of prompt content similar to a "standard cleaning action". When the user taps this prompt content, the smart mirror displays details of the standard cleaning action to the user, for example, "massaging the face with a finger pulp" shown herein or "patting the face with a hand" not shown in the figure. After the user taps the details, the smart mirror returns to display "step 1: cleaning". For another example, as shown in FIG. 8d, the user is performing step 1: cleaning. In this case, the smart mirror detects that the skin care action is nonstandard, and prompts, by using the display screen, the user of prompt content similar to a "standard cleaning action". When the user taps this prompt content, the smart mirror presents the standard cleaning action to the user by using the display screen. After the user taps the display screen again, the smart mirror returns to display "step 1: cleaning".

S3032: Output the integrity of the skin care process based on the skin care actions and the duration of each skin care action.

The smart mirror may obtain the integrity of the skin care process based on the skin care action and the duration and the preset duration that correspond to the skin care action; and then output the integrity of the skin care process.

It should be noted that the preset skin care duration is duration of the entire skin care process, the preset duration is duration of one skin care action, and the two concepts are different. The preset skin care duration is greater than or equal to the preset duration.

On the foregoing basis, further, the extracting a target image feature from the image may include: if it is determined that there is a displacement of the hand relative to the face between different frames of images, extracting the target image feature. In other words, the target image feature is extracted only when it is determined that there is the displacement of the hand relative to the face between the different frames of images, to exclude a situation that the hand is always placed on the face without any action.

In some embodiments, the determining that there is a displacement of the hand relative to the face between different frames of images may include: extracting key point information of the face region and the hand region in the image, and determining, based on the key point information, that there is the displacement of the hand relative to the face between the different frames of images. The determining, based on the key point information, that there is the displacement of the hand relative to the face between the different frames of images includes at least one of the following:

In one case, when a relative location distance between the hand key point and the face key point changes between the different frames of images, it is determined that there is the displacement of the hand relative to the face between the different frames of images. For example, key points may be specifically the face key point and a hand center point. That there is the displacement of the hand relative to the face means that in the different frames of images, a relative location distance between the hand center point and the face key point changes. Further, in the different frames of images, when a change value of the relative location distance between the hand center point and the face key point is greater than a preset change value, it is determined that there is the displacement of the hand relative to the face between the different frames of images. Alternatively, in the different frames of images, when the change value of the relative location distance between the hand center point and the face key point is less than the preset change value, it is determined that there is no displacement of the hand relative to the face between the different frames of images. Still refer to FIG. 5b. FIG. 5b shows two frames of images that are adjacent in terms of time. The mouth of the user is closed in an image on the left of an arrow, and the mouth of the user is slightly open in an image on the right of the arrow. In this case, only a shape of the mouth changes, and there is little change in the relative location distance between the face key point and the hand center point. Therefore, it may be considered that there is no displacement of the hand relative to the face between the two frames of images.

In another case, when location information of the hand key point between the different frames of images changes, it is determined that there is the displacement of the hand relative to the face between the different frames of images.

The foregoing embodiment mainly describes how to determine the integrity of the skin care process, and the following describes how to output the integrity of the skin care process.

In a specific implementation, the outputting integrity of the skin care process may include: outputting the integrity of the skin care process by using at least one display type among a graph, a diagram, and scoring. For example, in FIG. 9a and FIG. 9b, the integrity of the skin care process is output in a form of a diagram, and in FIG. 9c, the integrity of the skin care process is output in a form of a graph.

Figure 9A:
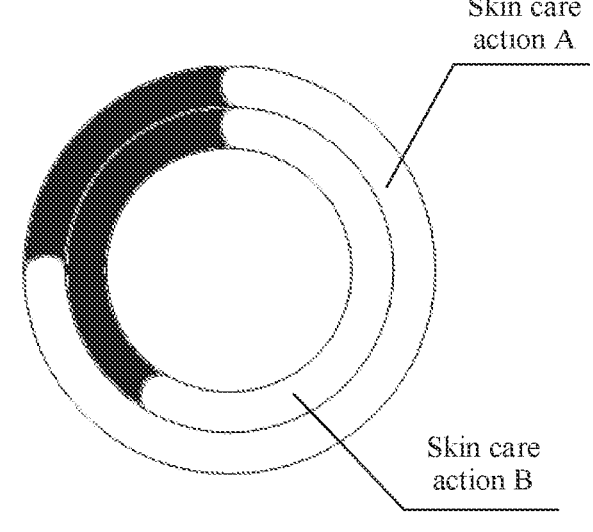
FIG. 9a is an example diagram of a screen of integrity of a skin care process according to an embodiment of this application.

With reference to FIG. 9a, different circles represent different skin care actions, and that the entire circle is completely and clearly presented indicates that a corresponding skin care action is complete and sufficient. If only a part of the circle is clearly presented, it indicates that duration of a corresponding skin care action does not reach preset duration, which is incomplete or insufficient. If the entire circle is not obvious, it indicates that a corresponding skin care action is omitted. In FIG. 9a, the skin care action A and the skin care action B are used as an example for description. However, this embodiment of this application is not limited thereto. For example, one circle may be further divided into at least two parts, and the parts are respectively used to indicate different skin care actions.

Figure 9B:
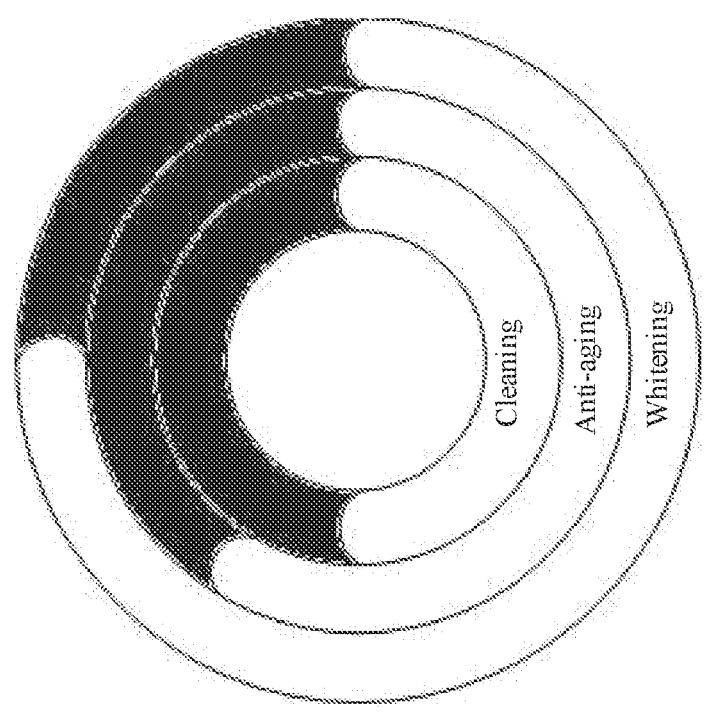
FIG. 9b is an example diagram of another screen of integrity of a skin care process according to an embodiment of this application.

With reference to FIG. 9b, different circles represent skin care actions with different functions, and that the entire circle is completely and clearly presented indicates that a skin care action of a corresponding function is complete and sufficient. If only a part of the circle is clearly presented, it indicates that duration of a skin care action of a corresponding function does not reach preset duration, which is incomplete or insufficient. If the entire circle is not obvious, it indicates that a skin care action of a corresponding function is omitted. For example, in FIG. 9b, skin care actions with the three functions of anti-aging, cleaning, and whitening are used an example for description. However, this embodiment of this application is not limited thereto. Anti-aging may be represented as a skin care action process in which the eye cream is applied. For example, in the entire skin care process, if the user does not use the eye cream or uses the eye cream for a short time, anti-aging may be represented by using a circle length. Cleaning may be represented as a skin care action process in which the toner and the milk are applied. When the user does not use the toner and the milk or uses the toner and the milk for skin care for short duration, this is reflected in a length of this circle, and a longer circle indicates higher integrity. Whitening may be reflected in skin care actions such as applying a facial mask and duration.

Figure 9C:
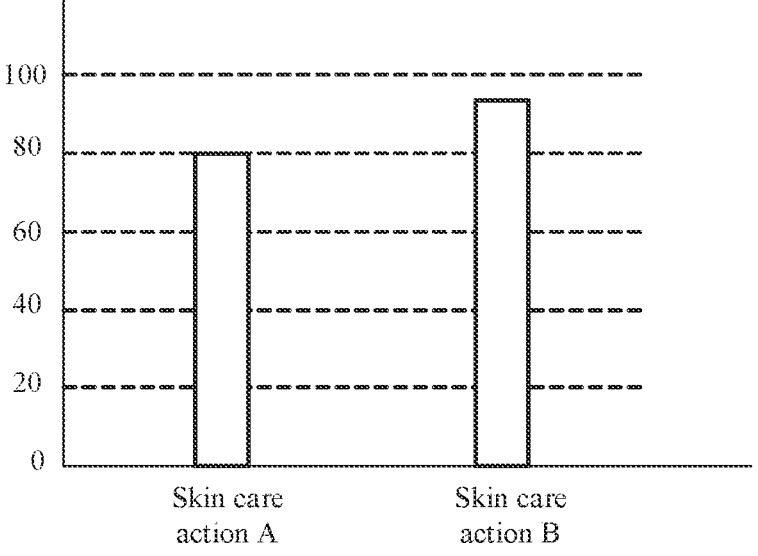
FIG. 9c is an example diagram of still another screen of integrity of a skin care process according to an embodiment of this application.

With reference to FIG. 9c, 100 indicates that a corresponding skin care action is complete and sufficient. A value greater than 0 and less than 100 indicates that duration of a corresponding skin care action does not reach preset duration, which is incomplete or insufficient. 0 indicates that a corresponding skin care action is omitted. For example, in FIG. 9c, the skin care action A and the skin care action B are used as an example for description. Integrity of the skin care action A is 80, and integrity of the skin care action B is 97. However, this embodiment of this application is not limited thereto.

In addition, the following is an example in which the integrity of the skin care process is output by using the display type of scoring:

the skin care action A: 80 scores; and the skin care action B: 100 scores.

Scores corresponding to the integrity are 0 to 100, and a higher score indicates higher integrity. Therefore, in the foregoing example, the skin care action A needs to be further improved.

Figure 10A:
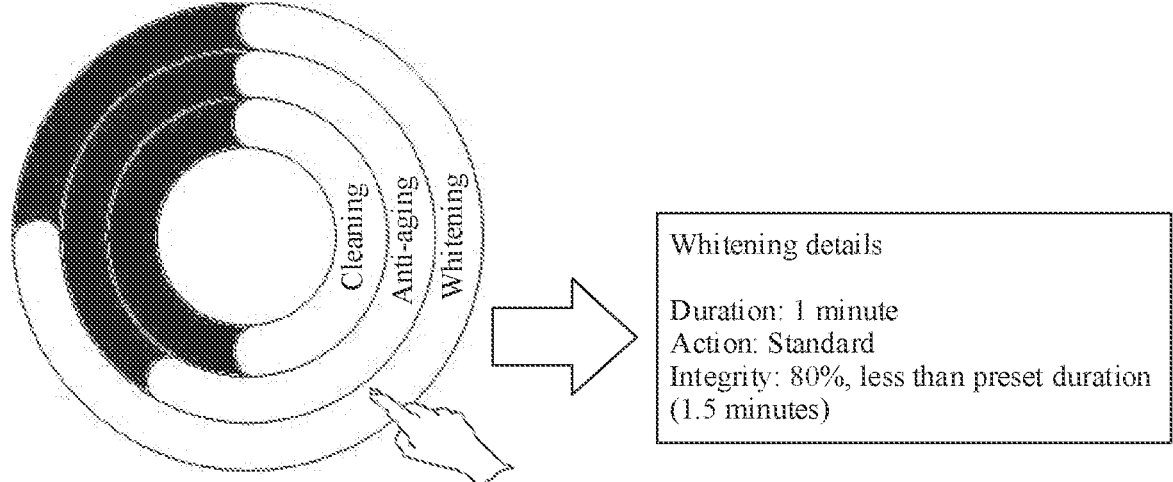
FIG. 10a is an example diagram of still another screen of integrity of a skin care process according to an embodiment of this application.

In addition, details of a corresponding region may also be displayed when the user points to or taps the integrity. FIG. 9b is used as an example. When the user taps a circle corresponding to "whitening", the smart mirror displays whitening details (that is, the smart mirror displays skin care details of the corresponding circle in response to a second operation performed on the circle) by using the display screen, as shown in FIG. 10a:

Whitening Details:

Duration: 1 minute

Action: Standard

Integrity: 80%, less than preset duration (1.5 minutes).

Figures 10B, 10C:
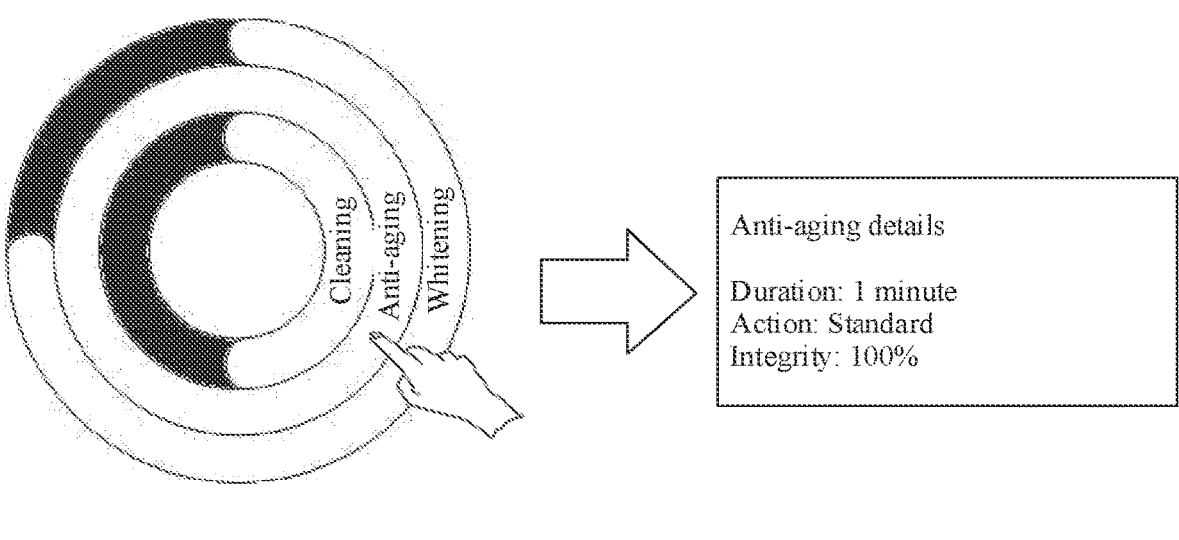
FIG. 10b is an example diagram of still another screen of integrity of a skin care process according to an embodiment of this application.
FIG. 10c is an example diagram of still another screen of integrity of a skin care process according to an embodiment of this application.

Alternatively, when the user taps a circle corresponding to "anti-aging", the smart mirror displays anti-aging details by using the display screen, as shown in FIG. 10b:

Anti-Aging Details:

Duration: 1 minute

Action: Standard

Integrity: 100%

Optionally, when the integrity is 100%, a gesture indicating "excellent" is displayed, for example, as shown in FIG. 10c.

Considering a limitation of the display screen of the smart mirror, the smart mirror may send the integrity to another electronic device that communicates with the smart mirror, for example, the mobile phone shown in FIG. 3. For example, with reference to FIG. 11a, the user taps or points to integrity displayed by the smart mirror in a form of a diagram. In response to this action, the smart mirror sends details of a corresponding region to the mobile phone. Herein, for example, the user taps a circle corresponding to whitening to send whitening details to the mobile phone, and the mobile phone displays the whitening details. Alternatively, the smart mirror generates an analysis report about the integrity. When the user points to or taps a virtual button or region that is identified with words similar to the "analysis report", the smart mirror sends the analysis report to the mobile phone, and the mobile phone displays content of the analysis report, as shown in FIG. 11b. It should also be noted that the analysis report may be a report corresponding to the entire skin care process, or may be an analysis report corresponding to a skin care action. This is not limited in this application.

Further, after the integrity of the skin care process is output, the skin care auxiliary method may further include: outputting, based on the integrity, a policy for giving skin care guidance for the user. For example, the policy for giving skin care guidance for the user is output in a form of a picture and/or a video.

Figure 12:
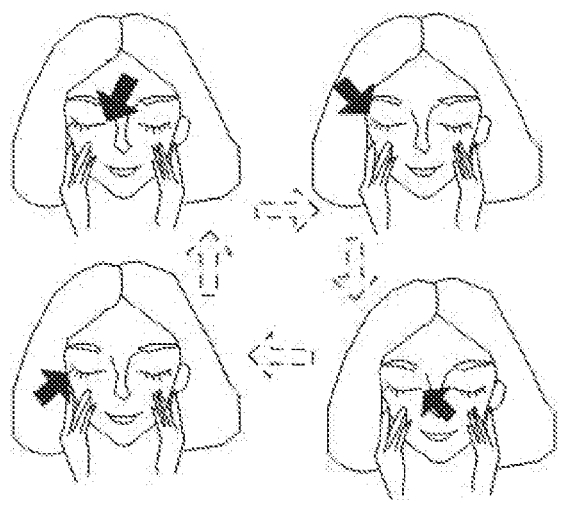
FIG. 12 is an example diagram of skin care guidance according to an embodiment of this application.

For example, in a morning skin care process, the user forgets to apply the eye cream. In this case, the integrity of the skin care process output by the electronic device indicates that this skin care operation is omitted, and how to correctly apply the eye cream is output based on the skin care operation. As shown in FIG. 12, pictures of arrows, fingers, or the like pointing up and down are used to indicate or tell the user to apply the eye cream and the like to the upper eyelids and the lower eyelids of the eyes, and an animation is used to interact with the user to indicate the user on correct and standard skin care actions. A dotted arrow is used to indicate a succession sequence of skin care actions.

Figure 11A:
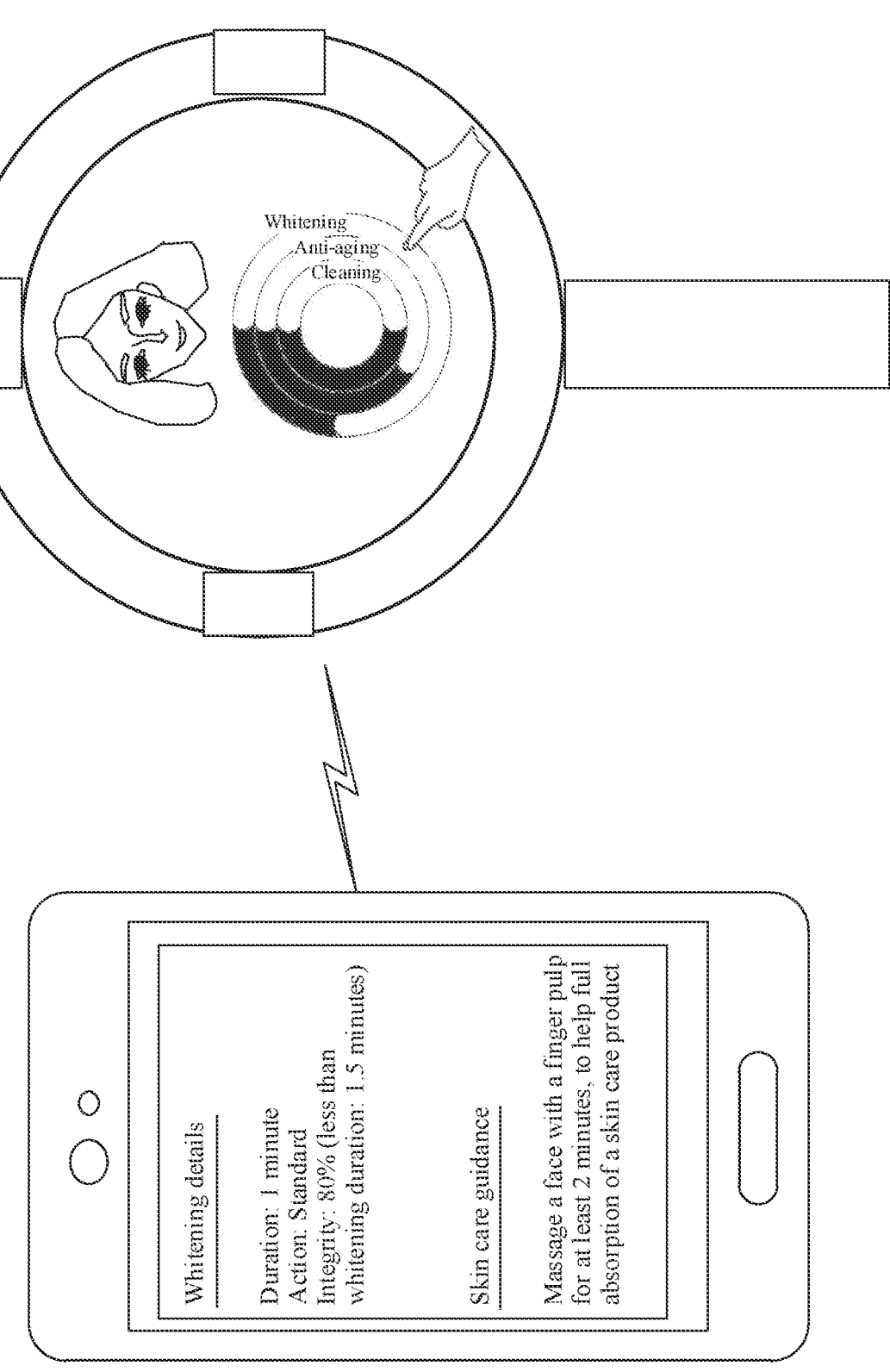
FIG. 11a is an example diagram of still another screen of integrity of a skin care process according to an embodiment of this application.
Figure 11B:
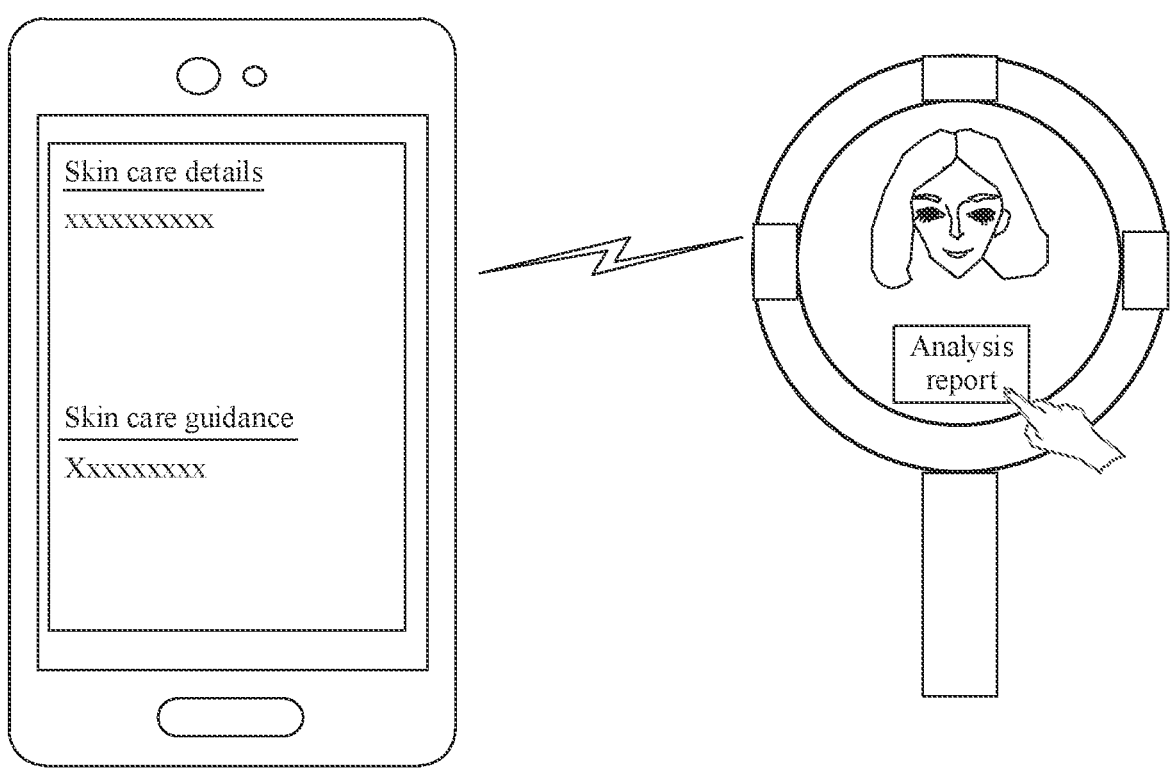
FIG. 11b is an example diagram of still another screen of integrity of a skin care process according to an embodiment of this application.

Alternatively, the analysis report or the details corresponding to the skin care action include related content of skin care guidance, for example, as shown in FIG. 11a and FIG. 11b.

In this embodiment, the integrity of the skin care process is output, to visually present an evaluation of the skin care process of the user. The policy of the skin care guidance is further provided based on the integrity, to remind the user of a problem encountered in the skin care process and provide a skin care suggestion, which further helps the user promote skin absorption of the skin care product.

In addition, considering power consumption of the electronic device, with reference to FIG. 13, the skin care auxiliary method may include the following steps:

S701: In response to the first operation performed on the first electronic device, the first electronic device obtains the image by using the camera.

For example, in actual application, when the user performs skin care in front of the smart mirror, the smart mirror usually obtains a skin care video of the user by using the camera. Because power consumption of the electronic device needs to be reduced, some key image frames need to be extracted from the skin care video in real time as subsequent images to be processed. Alternatively, the electronic device may obtain, based on a preset algorithm, an image frame at a preset time interval as a key image frame. Optionally, the extracting a key image frame may be specifically: detecting whether the image includes the hand region and the face region; and if the image includes the hand region and the face region, retaining the image as the key image frame, or if the image does not include the hand region or the face region, discarding the image.

S702: Preprocess the image.

The preprocessing may include but is not limited to at least one of cropping, scaling, rotating, and the like. Because a size of the image obtained by a smart mirror by using the camera is large, to reduce a runtime of the skin care auxiliary method and the power consumption, processing such as cropping, scaling, or rotating needs to be performed on the image.

S703: Extract the key point information of the face region and the hand region in the image.

S704: Determine, based on the key point information, whether there is a displacement of the hand relative to the face between the different frames of images.

If there is the displacement of the hand relative to the face between the different frames of images, S705 is performed. The different frames of images may be two frames of images that are adjacent in terms of time. Alternatively, to reduce the power consumption of the electronic device, different frames of images at a predetermined time interval are analyzed, where the predetermined time interval is greater than a frame interval of the video of the camera. If there is no displacement of the hand relative to the face between the different frames of images, S701 is performed again.

S705: Extract the target image feature from the image.

S706: Determine, based on the target image features corresponding to the plurality of frames of images, the skin care actions corresponding to the plurality of frames of images and the duration of each skin care action.

S707: Output the integrity of the skin care process based on the skin care actions and the duration of each skin care action.

Optionally, the outputting the integrity of the skin care process may include: displaying the integrity of the skin care process. The image is collected by the camera on the smart mirror. The displaying the integrity of the skin care process includes: displaying the integrity of the skin care process on the display screen of the smart mirror, that is, the smart mirror serves as an execution body of the skin care auxiliary method.

Alternatively, the outputting the integrity of the skin care process may include: sending the integrity of the skin care process to the second electronic device for displaying the integrity of the skin care process by the second electronic device.

The foregoing provides two output solutions, that is, the integrity of the skin care process is separately presented by the smart mirror or the second electronic device.

It should be noted that any one of the foregoing embodiments may be separately implemented, or may be implemented by using at least two of the foregoing embodiments in any combination. This is not limited herein.

It can be understood that, in the foregoing embodiments, the operations and the steps implemented by the first electronic device may be alternatively implemented by a component (for example, a chip or a circuit) usable in the first electronic device. This is not limited in this embodiment of this application.

Figure 14:
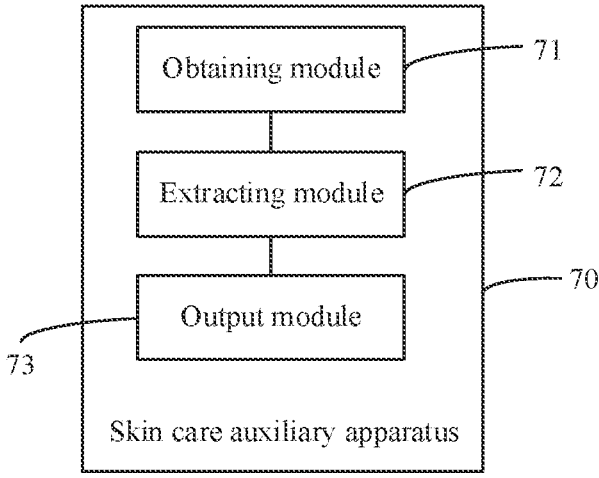
FIG. 14 is a schematic diagram of a structure of a skin care auxiliary apparatus according to an embodiment of this application.

FIG. 14 is a schematic diagram of a structure of a skin care auxiliary apparatus according to an embodiment of this application. The skin care auxiliary apparatus may be the first electronic device, may be a component (for example, an integrated circuit or a chip) of the first electronic device, or may be another communication module, configured to implement the operations corresponding to the first electronic device in any one of the foregoing embodiments. As shown in FIG. 14, a skin care auxiliary apparatus 70 in this embodiment includes an obtaining module 71, an extracting module 72, and an output module 73. The skin care auxiliary apparatus 70 in this embodiment can implement the solutions in any one of the foregoing embodiments by using the obtaining module 71, the extracting module 72, and the output module 73. Implementation principles and technical effects of the skin care auxiliary apparatus 70 are similar to those described above. Details are not described herein again.

Figure 15:
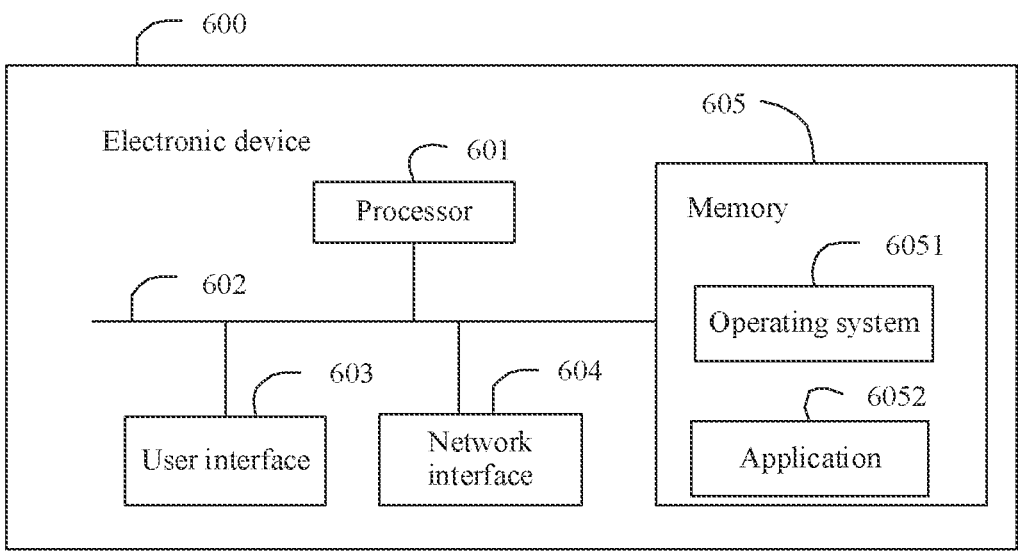
FIG. 15 is a schematic diagram of a structure of an electronic device according to an embodiment of this application.

FIG. 15 is a schematic diagram of a structure of an electronic device according to an embodiment of this application. As shown in FIG. 15, an electronic device 600 in this embodiment may be the first electronic device (or the component usable in the first electronic device) mentioned in the foregoing method embodiment. The electronic device 600 may be configured to implement the method corresponding to the first electronic device described in the foregoing method embodiment. For details, refer to the descriptions in the foregoing method embodiment. For example, the electronic device is a smart mirror.

The electronic device 600 includes at least one processor 601, at least one network interface 604 or another user interface 603, a memory 605, and at least one communication bus 602. The communication bus 602 is configured to implement connection and communication between these components. The electronic device 600 optionally includes the user interface 603, including a display (for example, a touchscreen).

The memory 605 may include a read-only memory and a random access memory, and provide instructions and data to the processor 601. Apart of the memory 605 may further include a non-volatile random access memory (NVRAM).

In some implementations, the memory 605 stores the following elements, an executable module or a data structure, or a subset thereof, or an extended set thereof:

The operating system 6051 includes various system programs, to implement various basic services and process a hardware-based task.

An application module 6052 includes various applications, such as the foregoing beauty APP, a media player (Media Player), and a browser (Browser), which are configured to implement various application services.

In this embodiment of this application, by invoking a program or instructions stored in the memory 605, the processor 601 is configured to perform the method in any one of the foregoing embodiments. Details are not described herein in this embodiment of this application.

It can be learned that, using the foregoing solution can help a user understand whether a skin care action and skin care time that are in a skin care process of the user are complete and so on, to assist the user in skin care and provide guidance for the user.

Figure 16:
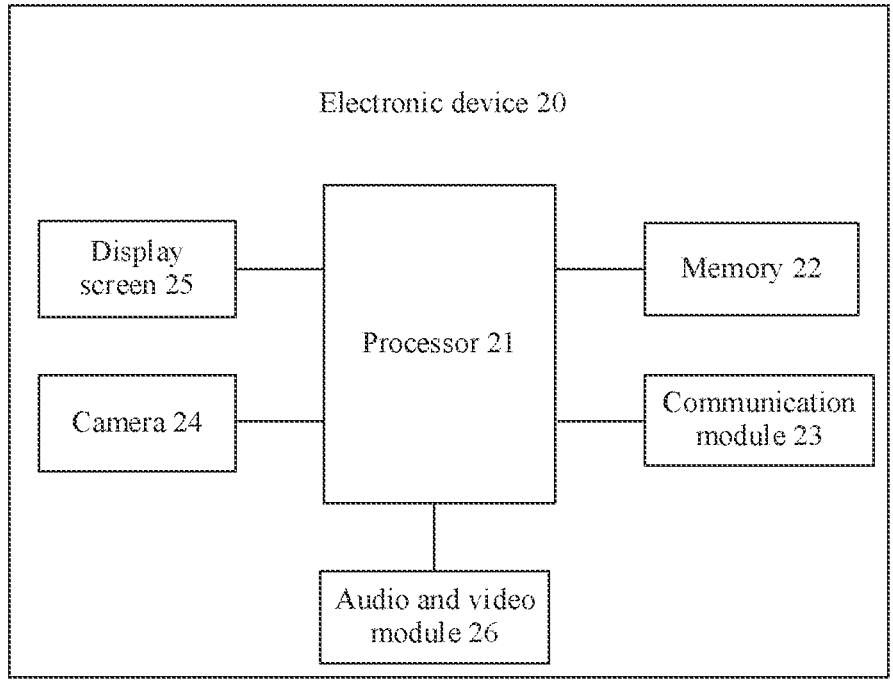
FIG. 16 is a schematic diagram of a structure of an electronic device according to another embodiment of this application.

FIG. 16 is a schematic diagram of a structure of an electronic device according to another embodiment of this application. With reference to FIG. 16, an electronic device 20 includes a processor 21, a memory 22 connected to the processor 21, a communication module 23, a camera 24, a display screen 25, and an audio and video module 26.

The processor 21 may include one or more processing units. For example, the processor 21 may include an application processor (application processor, AP), a modem processor, a graphics processing unit (graphics processing unit, GPU), an image signal processor (image signal processor. ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

In some embodiments, the processor 21 may be further equipped with a memory for storing instructions and data. For example, the memory in the processor 21 is a cache memory. The memory may store instructions or data that has been used or is cyclically used by the processor 21. If the processor 21 needs to use the instructions or the data again, the processor may directly invoke the instructions or the data from the memory. This avoids repeated access, reduces waiting time of the processor 21, and improves system efficiency.

In some embodiments, the processor 21 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like. The I2S interface may be used for audio communication. In some embodiments, the processor 21 may include a plurality of groups of I2S buses. The processor 21 may be coupled to the audio and video module 26 through the I2S bus, to implement communication between the processor 21 and the audio and video module 26.

The memory 22 may be configured to store computer-executable program code. The executable program code includes instructions. The internal 22 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 20. In addition, the memory 22 may include a high-speed random access memory, and may further include a nonvolatile memory, for example, at least one magnetic disk storage device, a flash memory, or a universal flash storage (universal flash storage, UFS). The processor 21 runs instructions stored in the memory 22 and/or instructions stored in the memory disposed in the processor, to perform various function applications and data processing of the electronic device 20.

The communication module 23 can provide a wireless communication solution that is applied to the electronic device 20, including 2G/3G/4G/5G and the like. The communication module 23 may include at least one filter, a switch, a power amplifier, a low noise amplifier (low noise amplifier, LNA), and the like. The communication module 23 may receive an electromagnetic wave through an antenna, perform processing such as filtering or amplification on the received electromagnetic wave, and transmit the electromagnetic wave to the modem processor 21 for demodulation. The communication module 23 may further amplify a signal modulated by the modem processor 21, and convert the signal into an electromagnetic wave for radiation through the antenna. In some embodiments, at least some functional modules of the communication module 23 may be disposed in the processor 21. In some embodiments, at least some functional modules of the communication module 23 may be disposed in a same device as at least some functional modules of the processor 21. For example, the communication module 23 may receive the video shown in this application, and store the received video in the memory 22.

The camera 24 may shoot an image or a video. For example, the camera 24 may shoot, under control of the processor 21, the video shown in this application, and store the video in the memory 22.

The display screen 25 is configured to display an image, a video, or the like. The display screen 25 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 20 may include one or N display screens 25, where N is a positive integer greater than 1.

The audio and video module 26 may play the video stored in the memory 22, and display the played video by using the display screen 25. For example, the audio and video module 26 is configured to convert digital audio information into an analog audio signal for output, and is also configured to convert an analog audio input into a digital audio signal. The audio and video module 26 may be further configured to: encode and decode an audio signal. In some embodiments, the audio and video module 26 may be disposed in the processor 21, or some functional modules of the audio and video module 26 are disposed in the processor 21. The audio and video module 26 may be further configured to compress or decompress a digital video. The electronic device 20 may support one or more types of video codecs. Therefore, the electronic device 20 may play or record videos in a plurality of coding formats, for example, moving picture experts group (moving picture experts group, MPEG)-1, MPEG-2, MPEG-3, and MPEG-4.

An embodiment of this application further provides a chip, where the chip includes a programmable logic circuit and an input interface. The input interface is configured to obtain to-be-processed data, and the logic circuit is configured to perform the method according to any one of the foregoing embodiments on the to-be-processed data. Implementation principles and beneficial effects of the chip are similar to those described above. Details are not described herein again.

An embodiment of this application further provides a computer-readable storage medium, where the computer-readable storage medium stores a computer program. The computer program includes at least one segment of code, and the at least one segment of code may be executed by a processor to implement the method according to any one of the foregoing embodiments. Implementation principles and beneficial effects of the computer-readable storage medium are similar to those described above. Details are not described herein again.

An embodiment of this application further provides a computer program product. When the computer program product runs on an electronic device, the electronic device is enabled to perform the method according to any one of the foregoing embodiments. Implementation principles and beneficial effects of the computer program product are similar to those described above. Details are not described herein again.

All or some of the steps of the foregoing method embodiments may be implemented by using hardware related to program instructions. The foregoing program may be stored in a readable memory. When the program is executed, the steps of the method embodiments are performed. The memory (storage medium) includes, a read-only memory (read-only memory, ROM), a RAM, a flash memory, a hard disk, a solid state disk, a magnetic tape (magnetic tape), a floppy disk (floppy disk), an optical disc (optical disc), and any combination thereof.

Embodiments of this application are described with reference to the flowcharts and/or block diagrams of the method, the device, and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processing unit of another programmable data processing device to generate a machine, so that the instructions executed by a computer or a processing unit of another programmable data processing device generate an apparatus for implementing a specific function in one or more processes in the flowcharts and/or in one or more blocks in the block diagrams.

These computer program instructions may also be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operation steps are performed on the computer or the another programmable device to generate computer-implemented processing, and instructions executed on the computer or the another programmable device provide steps for implementing a specific function in one or more processes in the flowchart and/or one or more blocks in the block diagram.

Clearly, a person skilled in the art can make various modifications and variations to embodiments of this application without departing from the spirit and scope of this application. In this way, this application is intended to cover these modifications and variations of embodiments of this application provided that they fall within the scope of the claims of this application and their equivalent technologies.

What is claimed is:

1. A method implemented by a first electronic device, wherein the method comprises:
   obtaining a first operation performed on the first electronic device, wherein the first operation indicates a start of a skin care process;
   obtaining, in response to the first operation, an image using a camera of the first electronic device, wherein the image comprises a hand region and a face region;
   extracting, from the image, a target image feature related to the hand region and the face region;
   extracting, from a plurality of frames of images in a time sequence during the skin care process, target image features of the hand regions and the face region;
   determining, based on the target image features, one or more skin care actions corresponding to the frames of the images and a duration of each of the skin care actions; and
   outputting an integrity of the skin care process based on the one or more skin care actions and their respective durations.

2. The method of claim 1, wherein the integrity comprises at least one of whether a skin care action is standard, whether a skin care action is omitted, or whether a skin care time is sufficient.

3. The method of claim 1, wherein determining the skin care actions comprises determining, based on a pre-trained classifier, the skin care actions.

4. The method of claim 1, wherein after determining the duration, the method further comprises:

prompting a user to perform a next skin care action when the duration is greater than a preset duration; and prompting the user to continue a current skin care action when the duration is less than the preset duration.

5. The method of claim 1, wherein after determining the skin care actions, the method further comprises:

detecting whether each of the skin care actions is standard; and prompting a standard action corresponding to a corresponding skin care action when the corresponding skin care action is nonstandard.

6. The method of claim 1, further comprising determining, based on skin care actions, the duration, and a preset duration of each of the skin care actions, the integrity.

7. The method of claim 1, wherein the target image feature comprises at least one of:

a Euclidean distance between a hand key point and a face key point;

a Manhattan distance between the hand key point and the face key point;

a relative displacement between the hand key point and the face key point; or an optical flow feature.

8. The method of claim 1, wherein extracting the target image feature comprises extracting, from the image, the target image feature when there is a displacement of a hand relative to a face between different frames of images.

9. The method of claim 8, further comprising:

extracting key point information of the face region and the hand region in the image; and determining, based on the key point information, that there is the displacement.

10. The method of claim 9, wherein determining that there is the displacement comprises determining that:

a relative location distance between the hand key point and the face key point changes between the different frames of images; or location information of the hand key point between the different frames of images changes.

11. The method of claim 1, wherein outputting the integrity comprises outputting a graph, a score, or a diagram, wherein the diagram comprises a plurality of circles corresponding to different skin care actions, and wherein an integrity of a circle indicates an integrity of a corresponding skin care action.

12. The method of claim 11, further comprising:

obtaining a second operation performed on a selected circle; and displaying, in response to the second operation, skin care details of a skin care action corresponding to the selected circle.

13. The method of claim 1, wherein the integrity is output in an analysis report, and wherein the method further comprises:

displaying a virtual button indicating the analysis report;

obtaining a third operation performed on the virtual button; and displaying, in response to the third operation, content of the analysis report.

14. The method of claim 1, wherein outputting the integrity comprises sending the integrity to a second electronic device for outputting by the second electronic device.

15. The method of claim 1, wherein after outputting the integrity, the method further comprises outputting, based on the integrity, skin care guidance.

16. The method of claim 15, wherein outputting the skin care guidance comprises outputting a picture or a video.

17. The method of claim 1, wherein the first electronic device comprises a smart mirror.

18. An electronic device comprising:

a camera; and a processor coupled to the camera and configured to:

obtain an operation performed on the electronic device, wherein the operation indicates a start of a skin care process;

obtain, in response to the operation, an image using the camera, wherein the image comprises a hand region and a face region;

extract, from the image, a target image feature related to the hand region and the face region when there is a displacement of a hand relative to a face between different frames of images; and output, based on target image features corresponding to a plurality of frames of images, integrity of the skin care process, wherein the frames of images are generated in a time sequence in the skin care process.

19. A computer program product comprising computer-executable instructions that are stored on a non-transitory computer-readable storage medium and that, when executed by a processor, cause an electronic device to:

obtain an operation performed on the electronic device, wherein the operation indicates a start of a skin care process;

obtain, in response to the operation, an image using a camera of the electronic device, wherein the image comprises a hand region and a face region;

extract, from the image, a target image feature related to the hand region and the face region;

output, based on target image features corresponding to a plurality of frames of images, integrity of the skin care process, wherein the frames of images are generated in a time sequence in the skin care process; and output, based on the integrity, skin care guidance.

20. The electronic device of claim 15, wherein the processor is further configured to output the integrity by:

determining, based on the target image features, one or more skin care actions corresponding to the frames of images and a duration of each of the skin care actions;

further outputting, based on the one or more skin care action and the duration, the integrity; and extract the target image feature when there is a displacement of a hand relative to a face between different frames of images.

* * * * *